(12) United States Patent
Buttgenbach

(10) Patent No.: US 12,244,147 B1
(45) Date of Patent: Mar. 4, 2025

(54) TWIN-CONFIGURABLE ARCHITECTURE RENEWABLE POWER PLANT FOR HIGH CAPACITY FACTOR SERVICING OF CONTROLLABLE LOADS

(71) Applicant: 1st Avenue Nova, LLC, Los Angeles, CA (US)

(72) Inventor: Thomas Buttgenbach, Los Angeles, CA (US)

(73) Assignee: 1st Avenue Nova, LLC, Los Angeles, CA (US)

( * ) Notice: Subject to any disclaimer, the term of this patent is extended or adjusted under 35 U.S.C. 154(b) by 0 days.

(21) Appl. No.: 18/792,847

(22) Filed: Aug. 2, 2024

Related U.S. Application Data

(60) Provisional application No. 63/645,837, filed on May 10, 2024.

(51) Int. Cl.
*H02J 3/12* (2006.01)
*H02J 3/32* (2006.01)
(Continued)

(52) U.S. Cl.
CPC .............. *H02J 3/12* (2013.01); *H02J 3/32* (2013.01); *H02J 3/381* (2013.01); *H02J 3/003* (2020.01);
(Continued)

(58) Field of Classification Search
CPC ...... H02J 3/12; H02J 3/32; H02J 3/381; H02J 2300/40; H02J 3/003; H02J 2300/10;
(Continued)

(56) References Cited

U.S. PATENT DOCUMENTS 7,230,819 B2   6/2007   Muchow et al.
7,888,590 B2   2/2011   Niederer
(Continued)

FOREIGN PATENT DOCUMENTS

AR   122001 A1   8/2022
AR   122002 A1   8/2022
(Continued)

OTHER PUBLICATIONS

U.S. Appl. No. 18/819,161, filed Aug. 29, 2024, by Buttgenbach et al.

*Primary Examiner* — Alfonso Perez Borroto
(74) *Attorney, Agent, or Firm* — COOLEY LLP

(57) ABSTRACT

A renewable power system with a twin-configurable architecture is described. The system includes a renewable energy source (RES), an energy storage system (ESS), and at least one controllable load (CL) (e.g., AI training/datacenter). The system can serve as a baseload or semi-baseload plant for CL(s) and/or as a peaker or semi-peaker plant for an electric grid, or vice-versa, and optionally in parallel, can also provide ancillary services to the electric grid and/or to the CL(s). In certain embodiments, e.g. solar PV RES(es), the system can have capacity factors of at least about 60% and up to 100%, higher asset utilization, better economics for the RES-ESS, improved system performance, and lower energy costs as compared with known systems without a CL(s). By making load a variable, and integral part of the system, sophisticated resource allocation strategies, including AI algorithms, can be developed not previously possible with known systems lacking a CL(s).

30 Claims, 11 Drawing Sheets

(51) Int. Cl.
*H02J 3/38* (2006.01)
*H02J 3/00* (2006.01)

(52) U.S. Cl.
CPC ........... *H02J 3/004* (2020.01); *H02J 2203/10* (2020.01); *H02J 2300/10* (2020.01); *H02J 2300/24* (2020.01); *H02J 2300/40* (2020.01); *H02J 2310/52* (2020.01)

(58) Field of Classification Search
CPC .... H02J 2300/24; H02J 3/004; H02J 2310/52; H02J 2203/10
USPC .......................................................... 307/31
See application file for complete search history.

(56) References Cited

U.S. PATENT DOCUMENTS

| | | | |
|---|---|---|---|
| 10,666,185 B2 | 5/2020 | Aikens et al. | |
| 11,031,781 B1* | 6/2021 | Zanone | H02J 3/008 |
| 11,043,809 B1* | 6/2021 | Akyol | H02J 3/008 |
| 11,043,815 B2 | 6/2021 | Meeker et al. | |
| 11,063,554 B1 | 7/2021 | Hansen et al. | |
| 11,063,556 B1 | 7/2021 | Piatt et al. | |
| 11,070,165 B2 | 7/2021 | Orriols et al. | |
| 11,081,887 B1 | 8/2021 | Buttgenbach et al. | |
| 11,159,121 B2 | 10/2021 | Byrnes et al. | |
| 11,171,485 B1 | 11/2021 | Ramesh et al. | |
| 11,398,729 B1 | 7/2022 | Upreti et al. | |
| 11,404,871 B1 | 8/2022 | Hansen et al. | |
| 11,431,169 B1 | 8/2022 | Buttgenbach et al. | |
| 11,451,060 B1 | 9/2022 | Buttgenbach | |
| 11,451,191 B1 | 9/2022 | Hansen et al. | |
| 11,481,010 B1 | 10/2022 | Hansen et al. | |
| 11,482,864 B1 | 10/2022 | Kanan et al. | |
| 11,482,968 B2 | 10/2022 | Piatt et al. | |
| 11,489,337 B1 | 11/2022 | Buttgenbach et al. | |
| 11,489,491 B1 | 11/2022 | Hansen et al. | |
| 11,545,848 B1 | 1/2023 | Hansen et al. | |
| 11,563,325 B1 | 1/2023 | Hansen et al. | |
| 11,569,662 B1 | 1/2023 | Buttgenbach | |
| 11,581,738 B2 | 2/2023 | Ramesh et al. | |
| 11,581,741 B2 | 2/2023 | Campus et al. | |
| 11,588,329 B2 | 2/2023 | Zanone et al. | |
| 11,588,438 B2 | 2/2023 | Hansen et al. | |
| 11,588,439 B1 | 2/2023 | Hansen et al. | |
| 11,604,499 B1 | 3/2023 | Hansen et al. | |
| 11,606,062 B2 | 3/2023 | Hansen et al. | |
| 11,611,215 B1 | 3/2023 | Kanan et al. | |
| 11,611,217 B1 | 3/2023 | Buttgenbach | |
| 11,621,566 B1 | 4/2023 | Buttgenbach | |
| 11,641,177 B2 | 5/2023 | Hansen et al. | |
| 11,664,674 B2 | 5/2023 | Hansen et al. | |
| 11,689,155 B1 | 6/2023 | Hansen et al. | |
| 11,705,727 B2 | 7/2023 | Hansen et al. | |
| 11,710,965 B2 | 7/2023 | Zanone et al. | |
| 11,721,982 B1 | 8/2023 | Buttgenbach | |
| 11,726,517 B1 | 8/2023 | Ramesh et al. | |
| 11,728,651 B1 | 8/2023 | Sheehy et al. | |
| 11,757,404 B2 | 9/2023 | Hansen et al. | |
| 11,764,577 B2 | 9/2023 | Buttgenbach et al. | |
| 11,764,597 B1 | 9/2023 | Sheehy et al. | |
| 11,769,218 B1 | 9/2023 | Ramesh et al. | |
| 11,770,098 B2 | 9/2023 | Hansen et al. | |
| 11,782,399 B1 | 10/2023 | Buttgenbach et al. | |
| 11,789,507 B1 | 10/2023 | Hansen et al. | |
| 11,799,297 B1 | 10/2023 | Kanan et al. | |
| 11,804,719 B1 | 10/2023 | Kanan et al. | |
| 11,811,231 B1 | 11/2023 | Kanan et al. | |
| 11,811,233 B1 | 11/2023 | Sheehy et al. | |
| 11,811,236 B1 | 11/2023 | Buttgenbach | |
| 11,811,258 B1 | 11/2023 | Kanan et al. | |
| 11,824,357 B2 | 11/2023 | Buttgenbach et al. | |
| 11,831,161 B2 | 11/2023 | Buttgenbach et al. | |
| 11,831,162 B1 | 11/2023 | Kanan | |
| 11,841,725 B1 | 12/2023 | Ramesh et al. | |
| 11,848,560 B2 | 12/2023 | Buttgenbach | |
| 11,848,561 B1 | 12/2023 | Naghib et al. | |
| 11,854,098 B1 | 12/2023 | Ramesh et al. | |
| 11,862,980 B1 | 1/2024 | Buttgenbach | |
| 11,876,399 B1 | 1/2024 | Kanan et al. | |
| 11,916,383 B2 | 2/2024 | Buttgenbach et al. | |
| 11,923,682 B1 | 3/2024 | Kanan | |
| 11,949,231 B1 | 4/2024 | Hansen et al. | |
| 11,949,233 B1 | 4/2024 | Naghib et al. | |
| 11,949,237 B2 | 4/2024 | Ramesh et al. | |
| 11,962,159 B1 | 4/2024 | Buttgenbach | |
| 12,074,445 B1 | 8/2024 | Naghib et al. | |
| 12,081,021 B2 | 9/2024 | Buttgenbach et al. | |
| 2006/0137348 A1 | 6/2006 | Pas | |
| 2006/0260672 A1 | 11/2006 | Niederer | |
| 2015/0162865 A1 | 6/2015 | Cowham | |
| 2015/0354545 A1* | 12/2015 | Conlon | F01K 23/18 60/39.182 |
| 2018/0337632 A1 | 11/2018 | Byrnes et al. | |
| 2019/0036340 A1 | 1/2019 | Meeker et al. | |
| 2020/0059192 A1 | 2/2020 | Orriols et al. | |
| 2020/0144824 A1 | 5/2020 | Campus et al. | |
| 2020/0252022 A1 | 8/2020 | Larsen | |
| 2021/0226466 A1 | 7/2021 | Hansen et al. | |
| 2022/0018114 A1 | 1/2022 | Akagawa et al. | |
| 2022/0052524 A1* | 2/2022 | Akyol | H02J 7/00712 |
| 2023/0120165 A1 | 4/2023 | Hansen et al. | |
| 2023/0129279 A1 | 4/2023 | Buttgenbach et al. | |
| 2023/0187933 A1 | 6/2023 | Buttgenbach et al. | |
| 2023/0231378 A1 | 7/2023 | Buttgenbach et al. | |
| 2023/0246453 A1 | 8/2023 | Buttgenbach et al. | |
| 2023/0275430 A1 | 8/2023 | Buttgenbach et al. | |
| 2024/0039295 A1 | 2/2024 | Buttgenbach | |
| 2024/0212069 A1 | 6/2024 | Ramesh et al. | |

FOREIGN PATENT DOCUMENTS

| | | |
|---|---|---|
| AU | 2020389482 B1 | 8/2021 |
| AU | 2020389483 B1 | 9/2021 |
| AU | 2020389481 A1 | 11/2021 |
| AU | 2021107535 A4 | 1/2022 |
| AU | 2021218240 B2 | 6/2022 |
| AU | 2022224727 B2 | 11/2023 |
| CA | 3128943 A1 | 8/2020 |
| CA | 3121360 C | 4/2022 |
| CA | 3121364 C | 5/2022 |
| CA | 3121532 C | 7/2022 |
| CN | 113646984 A | 11/2021 |
| DE | 202012010573 U1 | 1/2013 |
| EP | 3921914 A1 | 12/2021 |
| EP | 3931660 A1 | 1/2022 |
| EP | 3931661 A1 | 1/2022 |
| EP | 4133564 A1 | 2/2023 |
| EP | 4175101 A1 | 5/2023 |
| EP | 4189798 A1 | 6/2023 |
| EP | 3931934 B1 | 8/2023 |
| EP | 4241356 A1 | 9/2023 |
| EP | 4244945 A1 | 9/2023 |
| EP | 4246752 A1 | 9/2023 |
| EP | 4254784 A2 | 10/2023 |
| EP | 4338248 A1 | 3/2024 |
| EP | 4370982 A1 | 5/2024 |
| EP | 4381554 A2 | 6/2024 |
| GB | 2596240 B | 9/2023 |
| IN | 202117037504 A | 12/2021 |
| JP | 2022519736 A | 3/2022 |
| JP | 7113145 B2 | 8/2022 |
| JP | 7170141 B2 | 11/2022 |
| JP | 7219341 B2 | 2/2023 |
| JP | 2023067872 A | 5/2023 |
| JP | 2023067873 A | 5/2023 |
| JP | 7464657 B2 | 4/2024 |
| KR | 20210125040 A | 10/2021 |
| PE | 20211837 A1 | 9/2021 |
| SA | 14385 B1 | 12/2023 |
| TW | I760283 B | 4/2022 |
| TW | I770981 B | 7/2022 |
| TW | I771203 B | 7/2022 |
| TW | I834160 B | 3/2024 |

(56) References Cited

FOREIGN PATENT DOCUMENTS

| | | |
|---|---|---|
| WO | WO-2020163749 A1 | 8/2020 |
| WO | WO-2020203395 A1 | 10/2020 |
| WO | WO-2021225632 A1 | 11/2021 |
| WO | WO-2021225633 A1 | 11/2021 |
| WO | WO-2021225634 A1 | 11/2021 |
| WO | WO-2022251061 A1 | 12/2022 |
| WO | WO-2023018512 A2 | 2/2023 |
| WO | WO-2023038709 A1 | 3/2023 |
| WO | WO-2023069161 A1 | 4/2023 |
| WO | WO-2023069316 A1 | 4/2023 |
| WO | WO-2023146609 A1 | 8/2023 |
| WO | WO-2023146615 A1 | 8/2023 |
| WO | WO-2023219696 A1 | 11/2023 |
| WO | WO-2024006113 A1 | 1/2024 |
| WO | WO-2024010687 A1 | 1/2024 |
| WO | WO-2024015089 A1 | 1/2024 |
| WO | WO-2024020011 A1 | 1/2024 |
| WO | WO-2024025576 A1 | 2/2024 |
| WO | WO-2024076352 A1 | 4/2024 |

* cited by examiner

TWIN-CONFIGURABLE ARCHITECTURE RENEWABLE POWER PLANT FOR HIGH CAPACITY FACTOR SERVICING OF CONTROLLABLE LOADS

CROSS-REFERENCE TO RELATED APPLICATIONS

This application claims the benefit of U.S. Provisional Patent Application No. 63/645,837, filed May 10, 2024 and titled "Twin Mode Renewable Electric Generation Resources and Energy Storage Systems Serving High Capacity Factor Controllable Loads," the entirety of which is incorporated by reference herein in its entirety.

FIELD OF THE DISCLOSURE

This disclosure relates generally to energy generation, storage, and distribution, and more particularly, to a configurable renewable powerplant providing efficient generation and asset utilization for behind-the-meter and in-front-of-the-meter loads benefitting from high-capacity factors or peaking power with constraint grid connections.

BACKGROUND

The global shift towards renewable energy sources has catalyzed innovative developments in energy generation, storage, and distribution, aimed at reducing greenhouse gas emissions and fostering sustainable energy practices. Traditional energy grids rely on fossil fuel generation, presenting challenges in terms of environmental impact, slow response times, and resource depletion. In contrast, renewable energy technologies, such as solar, wind, and hydroelectric power, offer abundant and environmentally friendly alternatives. However, the intermittent nature of many renewable energy resources necessitates efficient storage and distribution systems to address fluctuations in supply and demand. Consequently, there exists a critical need for advancements in renewable energy storage and electric grid and load management to optimize the integration of renewable energy into existing power infrastructures. Additionally, after decades of near flat electricity demand growth in developed countries, a huge rise in demand is occurring for clean and affordable electricity from 2 sectors: (i) transitioning from fossil fuels to clean energy sources powering much of the electric gid, real estate, transportation, and commercial/industrial processes, and (ii) the digital transformation of our economy, e.g. datacenters and now AI training. This growth puts additional strain on existing electric grid infrastructure, creating a need for advancements and new approaches by integrating these new loads into more flexible power plant system architecture operated by smart/AI controllers taking a holistic view of the entire energy system.

SUMMARY

The following is a non-exhaustive listing of some aspects of the present techniques. These and other aspects are described in the following disclosure.

In some embodiments, a system includes at least one renewable energy source (RES), at least one energy storage system (ESS), and a controller. The at least one RES is configured to electrically couple to a grid interconnection point of an electric grid. An aggregated alternating current (AC) power output capacity of the at least one RES significantly (e.g., by a factor of at least about 1.3 times) exceeds a point of grid interconnect (POGI) limit of the grid interconnection point (also referred to herein as the "POGI capacity"). In some instances, an electric grid interconnection at the POGI can specify a different capacity/value for the POGI capacity depending on whether the system is a net load to the electric grid or a net generation resource for the electric grid. Thus, where applicable, the POGI capacity numbers discussed herein and used for calculations herein shall be understood to refer to the capacity of the POGI in the corresponding load or generation scenario. The at least one ESS is electrically coupled to the grid interconnection point and the at least one RES. The at least one ESS has an aggregated power capacity that is less than or equal to the aggregated power output capacity (e.g., AC power output capacity) of the at least one RES. The controller is communicatively coupled with at least one controllable load, the at least one ESS, and the at least one RES. The at least one controllable load(s) can be positioned/located in-front-of-the-meter (e.g., energy-related activities occurring on a utility company/entity side of the electric grid) and/or behind-the-meter (e.g., energy-related activities occurring on the customer side of the electric grid, optionally on the customer's premises/on-site, and/or energy-related activities occurring on the electric grid but involving one or more independent power producers (IPPs), utilities, customer specific tariff(s), and/or energy service providers (ESPs)), as further discussed herein. In-front-of-the-meter operations can include, but are not limited to, direct access, pseudo-ties (e.g., involving one or more balancing authorities), and/or special tariffs. As used herein, "direct access" can refer, by way of non-limiting example, to an electric service option (e.g., a retail electric service option) in which customers can purchase electricity from a competitive non-utility entity such as an ESP (or a utility with a customer or customer group specific tariff), optionally within a service territory of a utility that itself is still responsible for transmission and distribution for the direct access customers. It is noted that different utility service territories can use differing nomenclatures to refer to "direct access," but nevertheless can have the shared ability to provide to customers the option of purchasing electric service(s) directly from an energy provider(s).

The controller is configured to control a net load profile of the at least one CL such that the net load profile of the at least one CL includes at least one value between a maximum net load value and a minimum net load value of the at least one CL. As used herein, a "net load profile" for a CL(s) can refer to the total/gross load of the CL(s) minus the RES generation allocated to the CL(s), and a "net load profile" for the electric grid can refer to the total/gross load minus renewable energy generation allocated to the electric grid. Controlling a net load profile of the at least one CL can include controlling one or more subsystems of the at least one CL, for example to perform "pre-cooling" of a data center. The controller is also configured to provide a first instruction to at least one of the at least one RES or the at least one ESS to provide a first portion of electric power generated by the at least one RES or stored by the at least one ESS to at least one controllable load up to an aggregated power demand. The controller is also configured to provide a second instruction to at least one of the at least one RES or the at least one ESS to provide power to the electric grid in response to (A) electric power generated by the at least one RES exceeding an aggregated power capacity of the ESS and the aggregated power demand, or (B) the controller, using a predictive algorithm and power data, determining that a grid condition exists in a power system forecast. The controller is also configured, in response to determining that the grid condition exists without the electric power generated by the at least one RES exceeding the aggregated power capacity of the ESS and the aggregated power demand, to provide a third instruction to the at least one controllable load to decrease or increase a power demand at the at least one controllable load. Alternatively or in addition, the controller can be configured to provide a fourth instruction to the at least one controllable load to increase a power demand at the at least one controllable load in response to detecting/ determining that the ESS has reached a storage limit, and/or in response to a prediction that the ESS will reach a storage limit at a future time (e.g., at a time when the ESS is predicted to next reach a storage limit without providing energy to the at least one controllable load), and/or in response to determining that it is operationally or economically more desirable to do so, such that excess energy can be used by the at least one controllable load (e.g., to perform pre-cooling for a data center).

In some embodiments, a method of providing power on an RES-ESS-CL system includes providing, at a first time and by at least one of a renewable energy source (RES) or an energy storage system (ESS), power to a point of grid interconnect (POGI) associated with an electric grid, the POGI disposed between at least one controllable load and the electric grid. The method also includes providing, at a second time and by the at least one of the RES or the ESS, power to the at least one controllable load. The method also includes providing, at a third time, power received from the electric grid at the POGI to the ESS. The method also includes providing, at a fourth time, power from received from the electric grid at the POGI to the at least one controllable load. The method also includes providing, at a fifth time, no power via the POGI and providing at least one of power from the ESS to the at least one controllable load, power from the RES to the at least one controllable load, or power from the RES to the ESS.

In some embodiments, a non-transitory, processor-readable medium stores instructions that, when executed by a processor, cause the processor to cause at least one of a renewable energy source (RES) or an energy storage system (ESS) to supply electric power to a controllable load without using an electric grid. The processor-readable medium also stores instructions that, when executed by a processor, cause the processor to cause at least one of the RES or the ESS to supply electric power to the electric grid in response to determining that (A) electric power generated by the at least one RES exceeds a storage capacity associated with the ESS and a power demand associated with the controllable load, or (B) a grid condition associated with the electric grid exists. The processor-readable medium also stores instructions that, when executed by a processor, cause the processor to cause the controllable load to decrease or increase a power demand associated with the controllable load when the grid condition exists without the electric power generated by the at least one RES exceeding the local storage capacity and the local power demand.

Some embodiments of the present disclosure include a system comprising a grid interconnection point that is on an electric grid and that has a point of grid interconnect (POGI) limit; at least one renewable energy source (RES) that is electrically coupled to the grid interconnection point, wherein an aggregated AC power output capacity of the at least one RES significantly (e.g., by a factor of at least about 1.3 times) exceeds the POGI limit; at least one ESS that is electrically coupled to the grid interconnection point and the at least one RES, wherein the at least one ESS has an aggregated power capacity that is less than the aggregated power output capacity; at least one controllable load that is electrically coupled to at least one of the at least one RES or the at least one ESS, wherein the at least one controllable load has an aggregated power demand that is less than the aggregated power output capacity; and a controller that is communicatively coupled with the at least one controllable load, the at least one ESS, and the at least one RES, wherein the controller is configured to: provide first instructions to at least one of the at least one RES or the at least one ESS to provide a first portion of the electric power generated by the at least one RES or stored by the at least one ESS to the at least one controllable load up to the aggregated power demand; provide second instruction to at least one of the at least one RES or the at least one ESS to provide power to the electric grid via the grid interconnection point only if (1) the electric power generated by the at least one RES exceeds the aggregated power capacity and the aggregated power demand or (2) the controller, using a predictive algorithm and power data obtained from the power data sources, determines that a grid condition exists in a power system forecast; and if the grid condition exists without the electric power generated by the at least one RES exceeding the aggregated power capacity and the aggregated power demand, providing third instructions to the at least one controllable load to decrease or increase power demand at the at least one controllable load. Alternatively or in addition, the controller can be configured to provide fourth instructions to the at least one controllable load to increase a power demand at the at least one controllable load in response to detecting/determining that the ESS has reached a storage limit and/or in response to a prediction that the ESS will reach a storage limit at a future time (e.g., at a time when the ESS is predicted to next reach a storage limit without providing energy to the at least one controllable load), or it is operationally or economically more desirable, such that excess energy can be utilized by the at least one controllable load.

Some embodiments of the present disclosure include tangible, non-transitory, machine-readable media storing instructions that when executed by a data processing apparatus cause the data processing apparatus to perform operations including the above-mentioned process(es).

Some embodiments of the present disclosure include a system having one or more processors and a memory storing instructions that, when executed by the one or more processors, cause the one or more processors to effectuate operations of the above-mentioned process(es).

Figure 1:
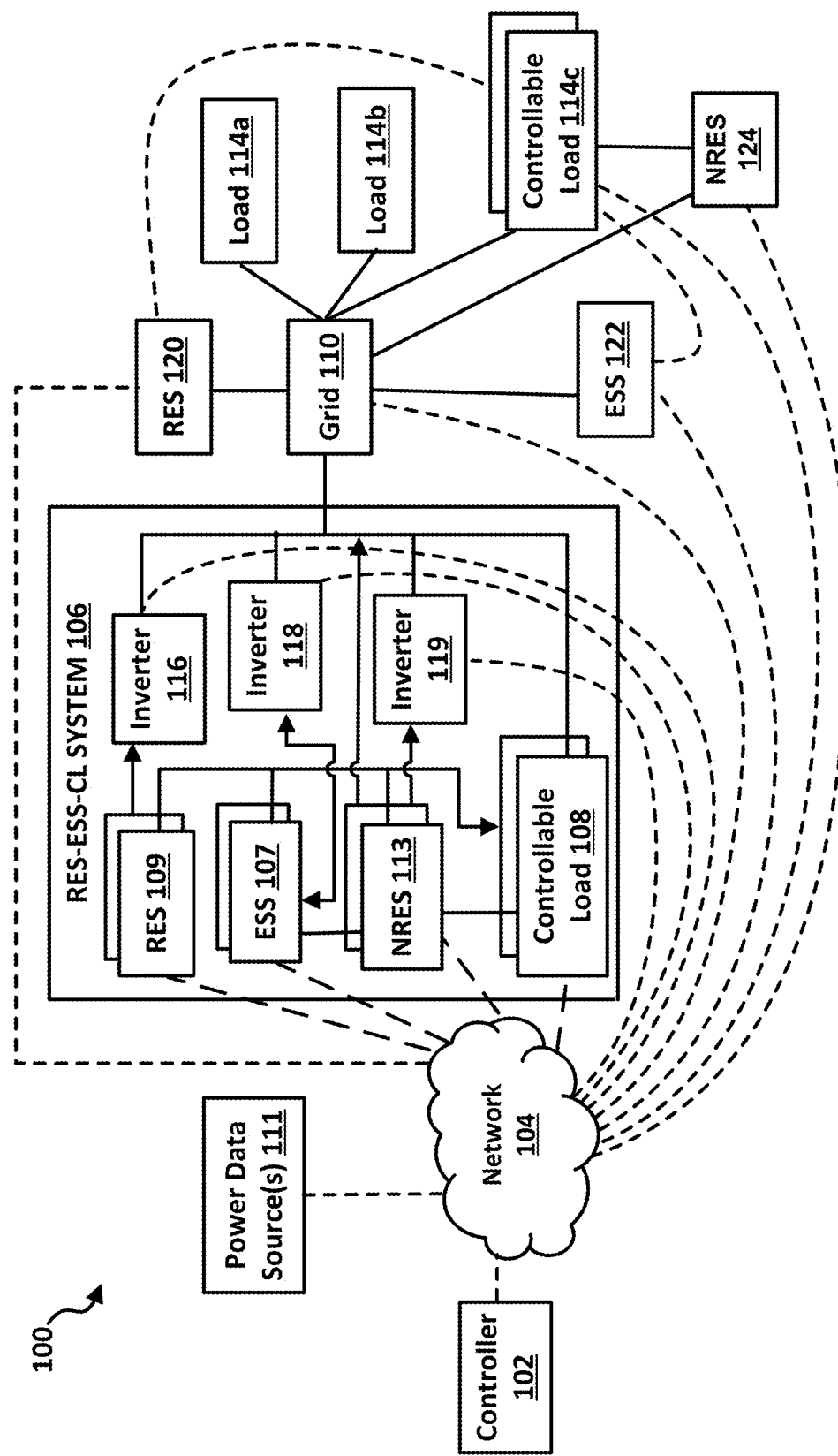
FIG. 1 is a schematic view illustrating an embodiment of a twin-mode power generation, storage, and distribution system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of energy generation, storage, and distribution and renewable energy power plants, grid connected loads, both controllable and non-controllable and/or correlated, partially correlated, and uncorrelated, as well as behind-the-meter controllable and/or non-controllable loads and in-front-of-the-meter controllable and/or non-controllable loads. Indeed, the inventors wish to emphasize the difficulty of recognizing those problems that are nascent and will become much more apparent in the future should trends in industry continue as the inventors expect such as, for example, massive load growth from industries such as data centers, artificial intelligence (AI) training, vertical farming, carbon capture, electric vehicle charging, smelters, water treatment plant (including desalination and purification), industrial or real estate process energy transitioning to electricity, hydrogen production, cryptocurrency mining, and the like. Further, because multiple problems are addressed, it should be understood that some embodiments are problem-specific, and not all embodiments address every problem with traditional systems described herein or provide every benefit described herein. That said, improvements that solve various permutations of these problems are described below.

In recent years, new loads have been introduced to the power grid. These loads often have large power requirements. For example, loads such as a vertical farming, data centers, AI training, cryptocurrency mining, smelters, water treatment plant (including desalination and purification), electric vehicle charging, industrial or real estate process energy transitioning to electricity, hydrogen production, or other loads may include power intensive processes. Also, these loads may be uncorrelated with the conventional grid where the power profile or net load profile is different than the typical power consumption of the grid that often follows HVAC schedules in hot areas, heating in colder climates, established industrial process in the area, time of day when business and residential zones are typically requiring power, or the like. These new loads often desire clean renewable energy as well as inexpensive energy as energy is often a large portion of their operating expenses.

However, renewable energy generation sources, notably solar photovoltaic (PV) and wind power generators, have variability, influenced by natural and meteorological conditions. The variability poses challenges to grid stability, including frequency and voltage deviations. As renewable electric generation resources begin to supply a larger portion of the electrical grid and replace traditional base-load units such as coal-fired and nuclear-powered plants, a host of technical challenges arise. These include grid interconnection, power quality, reliability, stability, protection, and generation dispatch and control. The intermittent nature of solar and wind generation, coupled with rapid fluctuations in output, has resulted in the integration of energy storage systems (ESS), with energy storage devices such as battery energy storage systems (BESS). This integration aims to enhance grid compatibility by smoothing fluctuations and improving the predictability of energy supply from renewable energy sources as conventional renewable energy resources typically exhibit low-capacity factors, typically ranging from 15% to 40% depending on the resource, the location and weather patterns.

Typically, these RES-ESS systems can be linked with transmission resources of an electrical grid at a point of grid interconnection (POGI) that typically operates at a voltage that is optimal for transmitting electric power over long distances with minimal transmission losses. To uphold reliability and safeguard transmission resources, a POGI limit is established for each electrical energy generation resource, delineating the maximum power that can be supplied to a transmission resource.

To enhance the revenue potential from a photovoltaic energy generation resource in tandem with associated transmission resources of predetermined cost, oversizing the aggregate output of a photovoltaic array or other renewable energy source (RES) relative to the POGI limit has recently been introduced. This strategic move is motivated by the sporadic occurrence of peak photovoltaic generation, attributable to various factors such as adverse weather conditions, solar conditions, panel cleanliness, PV panel aging, and elevated ambient air temperatures diminishing PV panel output. The ESS may be used in conjunction with the oversized RES to help absorb excess power production during peak energy generation times that exceeds the POGI limit and provide power to the grid during times when the RES is not generating power or generating less power than the POGI limit. It should be noted that while the ESS may be charged during peak energy generation times, the ESS may be charged when the power distribution to the grid is below the POGI limit to provide a fuller ESS capacity in some circumstances, or the ESS may be charged by the grid via the POGI. While oversizing the photovoltaic array increases power sales over the year and the ESSs absorb excess power generation during peak RES generation times, these systems still require the need to curtail excess power during peak irradiance/wind periods and when the ESS is full, often accomplished through inverter clipping required by regulations to shield the grid from potential failures induced by circuit overloads, transmission line overloads, transformer strains, or instances necessitating circuit breakers to disconnect an over-generating facility. This curtailment of power is often undesirable. Furthermore, while the new grid loads, discussed above, are seeing more renewable power on the grid and may contract with renewable energy sources to deliver power on the grid, cost and reliable renewable power is still an issue as the systems still require grid transmission fees and some reliance on non-renewable energy sources.

Another issue with current power plants is that the grid often relies on peaking power plants—also known as peaker plants-when power demand is high. Peaking power plants may often include low use, high-emitting power plants that grid operators call on at times of high demand. Gas turbines or diesel generators are common peaker plants because of their ability to start and ramp up at times of high demand. Because of their high cost to operate and maintain and their use of fossil fuels, these power plants are often undesirable but a necessity for the grid to provide additional generation to meet any potential power shortfalls. It is estimated that peaker plants make up 10% of the grid infrastructure to supply energy during dangerous peak demand, which occurs only 1% of the time.

In light of these challenges, there is a pressing need for advancements in renewable electrical energy generation resources, energy storage, and distribution facilities. Additionally, there is a demand for sophisticated control methods to manage these facilities effectively. Furthermore, there is a necessity for streamlined processes to facilitate power delivery transactions for the outputs generated by such facilities. Further still, there is a need to provide reliable, inexpensive, renewable energy to certain industries as well as quickly provide power to the grid at peak times without the use of fossil fuels and without the peaker plant infrastructure required for grid stability.

Systems and methods of the present disclosure provide a twin-mode power generation, storage, and distribution system for providing a high-capacity factor baseload for a controllable load and peaking power for a gird connection. The twin-mode power generation, storage, and distribution system may include a networked renewable energy source ("RES") (e.g., solar, wind, etc.), energy storage system ("ESS'), and controllable load ("CL") facility or plant, where the combination may be referred to here as RES-ESS-CL or a RES-ESS-CL facility (of which a photovoltaic plus storage or "PV+S" facility is a subset). In various embodiments, the RES-ESS may be coupled directly with one or more controllable loads. As such, the one or more controllable loads may be defined as being behind-the-meter. The controllable load may be correlated or uncorrelated with a load on the grid. In some embodiments, the controllable load(s) may be on the grid or may be both on the grid and off the grid (e.g., one or more controllable loads may be behind-the-meter and one or more controllable loads may be in-front-of-the-meter). In various embodiments, the networked RES-ESS-CL system defaults as a baseload for supplying power to the controllable load for which the RES and ESS is built. As used herein, the phrase "capacity factor" refers to a ratio of electrical energy produced by an electricity generating system (e.g., a system including one or more RESes and/or one or more ESSes) to a load (e.g., of one or more controllable loads as to their maximum rated load, or of the electric grid via the POGI capacity thereof) that the electricity generating system is servicing.

In one or more embodiments, a RES-ESS-CL system or facility can be configured to reduce a correlation of one or more controllable loads with an electric grid. For example, a load profile of the one or more controllable loads (CL(s)) (e.g., a "net load" profile of the CL(s), which may refer to the total/gross load of a CL(s) minus the RES generation allocated to the CL(s)) may be shifted (e.g., in time or in load), adjusted, or modified in a de-correlating manner relative to a load profile of the electric grid (e.g., a "net load" profile of the electric grid, representing the total/gross load of the electric grid minus renewable energy generation allocated to the electric grid) or a power profile (e.g., a "net power" profile) of the electric grid, such that a performance associated with the RES-ESS-CL system (e.g., a financial performance of the RES-ESS-CL system, an asset utilization associated with the RES and/or the ESS, etc.) is improved. For example, the de-correlation can include causing one or more peaks of the load profile of the one or more controllable loads to no longer overlap with, or to overlap less with, one or more peaks of the load profile (e.g., net load profile), net power profile, or price of energy services profile of the electric grid. Alternatively or in addition, the de-correlation can include causing a shape of the load profile of the one or more controllable loads to be substantially inverse relative to, or otherwise differ from (e.g., be flatter than or less flat than, or time shifted), the load profile, power profile, or price of energy services profile of the electric grid, for example as shown graphically in FIGS. 9A-9C, discussed below.

The RES of the present disclosure may be oversized more so than other oversized RESes in comparison to the POGI limit because of the RES serves as a baseload for the controllable load rather than the grid. For example, the RES of the RES-ESS-CL system of the present disclosure may be overbuilt by many factors over the power limit of the POGI than what can be reasonably overbuilt in other oversized systems without suffering from inefficiencies or potentially lost energy. As discussed above, traditional oversized systems are built as a baseload for the grid. As such, RESes for oversized systems are typically capped at the sum of the power limit of the POGI and the ESS, where the ESS is sized to be up to or equal to the POGI, thus yielding a cap for the RES'es of 2× the POGI, which avoids curtailment of energy. For example, if the POGI limit is 100 MW, the ESS is then also sized to deliver 100 MW to the POGI, to be equal to (within allowable limits of the grid operator) or less than the POGI for maximum efficiency while using the maximum available transmission capability to the grid via the POGI. The RES is then limited to 200 MW (i.e., 2× the POGI), as any additional power from the system could not go anywhere and thus energy would be lost.

In contrast, the RES of the RES-ESS-CL system of the present disclosure is not limited by the POGI. Rather, the RES may have a capacity that is based on the capacity of the controllable load that is behind-the-meter. As such, the RES may scale three times, four times, five times, or higher than the POGI limit. For example, the POGI limit may be 100 MW, but the controllable load, which may include a plurality of controllable loads, may have a total capacity of 100 MW and the ESS may have a capacity of 300 MW, and the RES may have a capacity of 500 MW or other power output capacity. As such, with the behind-the-meter controllable load included in the RES-ESS-CL system, the RES may have a power capacity that is five times (or more) the POGI limit. As a result, the RES-ESS-CL system may be massively overbuilt when providing a baseload for a controllable load rather than providing a baseload to the grid. Thus, economies of scale can be realized for the RES and ESS, making the system more efficient with higher asset utilization. Furthermore, the RES-ESS-CL system of the foregoing example can provide very high capacity factors (which are the same in this example) for the CL and the electric grid, with values that are well in excess of what a known system without a CL would be able to accomplish. This again presents a very high asset utilization for the PGI electric grid connection and/or the CL, where the capacity factors can be more than 80%, and can even approach 100%. While the overbuild of the RES versus the POGI limit is one benefit of the RES-ESS-CL system, another benefit is that the RES-ESS-CL system's twin configurable architecture (also referred to as "twin mode" herein) can operate as a baseload or peaker plant for a controllable load and also as a peaker plant or baseload for the grid or a micro-grid or micro-utility grid (e.g., an islanded grid) or a geographically limited utility grid.

For example, while the RES-ESS of the RES-ESS-CL system acts as a baseload for the controllable load, the RES-ESS-CL may be in a twin mode, for example in that the RES-ESS-CL may also operate as a peaker plant and supply power to the grid when a condition to do so is satisfied. In some embodiments, a twin-configurable architecture system as described herein can be implemented in/as a single, standalone power plant, and can be configured to operate in a first mode, in which the system operates as a baseload or semi-baseload plant (i.e., operating between pure baseload and pure peaker) and/or provides ancillary services, and (optionally concurrently with, in parallel with, or overlapping in time with) a second mode, in which the system operates as a peaker plant or semi-peaker (between pure peaker and pure baseload) and/or provides ancillary services to a customer or group of customers. The ancillary services provided in the first mode made be the same as, overlap with, or be different from, the ancillary services provided in the second mode. In various embodiments, the condition may be based on power demand on the grid such as when the power demand on the grid satisfies a predetermined threshold or the delta of available power supply and power demand satisfies a predetermined threshold. During times of high grid demand and low power generation where the RES is not generating enough power to satisfy both the grid connection power capacity and the controllable load power capacity, the RES-ESS-CL may control the load at the controllable load by communicating with the controllable load to reduce power consumption such that the power can be redirected from the controllable load to the grid interconnection point. This may include redirecting power provided by the ESS or the RES from the controllable load to the grid interconnection.

In other embodiments, the overbuilt, high-capacity factor RES-ESS-CL system may experience times when the RES is generating too much power for the ESS and the CL to consume. During these peak power generation times, the RES-ESS-CL system may provide excess power generation to the grid. As such, the grid acts as a source to remove excess generated power or to subsidize the capital costs of building the oversized RES-ESS system by diverting power to the grid when conditions on the grid are favorable such that power can be provided more efficiently and cost effective to the controllable load. In contrast, recent RES-ESS systems are designed to be built to only service the grid.

In one or more embodiments of the present disclosure, the RES-ESS-CL system can be configured to control (e.g., using one or more controllers of the RES-ESS-CL system and/or using communications via one or more communications networks described herein) one or more "legacy" (e.g., non-renewable) power generators, such as a gas turbine(s) or diesel generator(s), in addition to the RES, ESS, and CL. These non-renewable energy sources (referred to herein and in FIG. 1 as "NRES") can be coupled to one or more CLs of the RES-ESS-CL system, one or more ESSes of the RES-ESS-CL system, and/or to the electric grid.

In one or more embodiments of the present disclosure, the RES-ESS-CL system can be configured to function/operate in multiple modes (e.g., more than two modes), each mode including two or more of: operation as a baseload (e.g., at one or multiple different output levels), operation as a peaker plant for an electric grid (e.g., at one or multiple different output levels), operation as a peaker plant for a micro grid or micro-utility (e.g., at one or multiple different output levels), or operation as a provider of one or more ancillary services to the electric grid. As used herein, "ancillary services" can refer to services that help to maintain or supplement the integrity, stability and/or power quality associated with an electric power transmission and/or distribution system. By way of non-limiting example, ancillary services may refer to one or more of: reactive power compensation, regulation including voltage regulation, flicker control, active power filtering, harmonic cancellation, frequency control (including inertia support, frequency containment reserves/primary control, frequency restoration reserves/secondary control, and/or replacement reserves/tertiary control), performing synchronized regulation (e.g., to correct/compensate for changes in electrical imbalances that can affect the stability of a power system), ramp up service, ramp down service, providing contingency reserves (e.g., supplying power to respond to an unexpected electrical outage or failure of an electrical element or system component such as a generator, a transmission line, a circuit breaker, a switch, etc.), black-start regulation (e.g., supplying electrical power for system restoration when the entire electrical grid or a subset thereof loses power), or flexibility reserves (e.g., supplying power to compensate for variability and/or uncertainty over longer timescales than are typically involved with contingency reserves, synchronized regulation and/or black-start regulation), day-ahead scheduling reserve, loss compensation, congestion management, or oscillation damping.

Thus, aspects of the present disclosure provide a smart network of controllable loads, ESSs, and RESes (e.g., solar and wind sharing a grid connection) that are behind-the-meter and in-front-of-the-meter. The RES-ESS-CL system may be "networked" for being centered around a single node (if a node is defined as one connection to the grid) that optimizes costs and capacity factor for the controllable loads (and maximize revenue/profitability/emergency needs) by increasing utilization of assets (such as ESS and RES). As such, aspects of the present disclosure provide more efficiency and better economics for a RES-ESS-CL system over overbuilt RES-ESS systems because the RES-ESS is built as a baseload for the controllable a load, which may benefit from lower cost of electricity and better capacity factors, when taking a system approach. Having a "controllable" load, means that the system architecture is not just limited to the generation, storage, and distribution, but incorporates the load and uses some uncorrelated "grid load" to subsidize economics through better asset utilization by making the RES-ESS a peaker plant. The grid may also provide flexibility and be a source of power when prices on the grid are inexpensive such that the life span of the ESS can be extended by reducing charge/discharge cycles. A controller powered by AI algorithms works to optimally get the most out of the synergies.

As discussed above, the controllable loads may be the new loads (e.g., AI training, data centers, vertical farming, smelters, EV charging, hydrogen production, water treatment plant (including desalination and purification), cryptocurrency mining, or the like) and can have different characteristics than the traditional loads on the grid (HVAC in hot areas, heating in colder, industrial, etc.). In order to utilize their high capital expenditures these new loads need to run with high utilization, which is a conflict with low capacity factor conventional renewables. However, at the same time, these new loads are very dependent on finding cheap power as their economics are dominated by electricity costs. While renewables are now often the cheapest form of power, their capacity factors are often low—to increase the capacity factor, one needs storage, which costs additional money. With embodiments of the present disclosure, the controller can cross-subsidize the storage cost and other capital costs with selling power to the grid when those prices are high (for which one usually needs ESS as well as prices are not high when renewables produce), effectively turning the power plant into a peaker plant for the grid, which can also provide valuable ancillary services to the grid or customers. So, by designing an RES and an ESS with one or more controllable loads, one can explore synergies and have a large ESS that is used to both drive capacity factor up and make lots of revenue when grid prices are high. Being behind-the-meter helps with avoiding grid charges that can dominate the economics.

Depending on the grid load profile (and price profile) and controllable load profile, the RES can be optimized in its operation (and design). Running simulation of the RES-ESS-CL system shows that the combination RES-ESS with controllable (and uncorrelated) loads gives better results at lower costs. That is because the ESS is better utilized, and the solar field or wind turbines are larger (EOS). The controllable loads can be in-front-of-the-meter and/or behind-the-meter-behind-the-meter has the additional advantage of maximizing interconnection/grid access that is a constraint, reducing losses, avoiding transmission charges, avoiding grid curtailments, avoiding grid congestion and related charges, and grid operator's overhead and administrative costs. The grid connection is valuable and expensive and fixed costs, so having more energy flowing through the entire system also drives cost per MWh down.

In some embodiments, the system may include multiple controllable loads (one or more behind-the-meter (e.g. AI training and vertical farming or cooling for data centers) that is the focus for cost optimization and one or more in-front-of-the-meter that may be used to optimize economics and utilization). Being grid connected also allows to run the controllable load(s) on cheap power when that is available from the grid (e.g. wind at night) further reducing costs, or providing or receiving power from ESSs on the grid or an RES. Again, the controller with machine learning/AI can predict and manage the system accordingly. The ESS on the grid may be controlled to store energy when the RES-ESS-CL system has too much production at RES and not enough behind-the-meter load and ESS capacity left or the controller determines that it is better to keep some ESS capacity unused) and the controller can push the power out to the grid. Similarly, when grid net loads are low (e.g., the grid is getting close to overgeneration from renewables) or energy prices are low, and to conserve battery life or stored power on the ESS of the RES-ESS-CL system, the controller may obtain power from an RES on the grid and/or from the grid marketplace.

In various embodiments, loads that are controllable loads may include loads where a controller, described herein, can change the demand by either increasing or decreasing power demand at that load. As such, the present disclosure considers both adjusting energy allocation from the RES and adjusting energy demand from one or more of the controllable loads that can either be on the grid or behind-the-meter. In contrast with known/non-controllable loads, controllable loads of the present disclosure can be controlled such that their energy demand/load has a value that is between 0 and a maximum value thereof, and can be dynamically adjusted or tuned over time, for example by a controller and/or in response to user inputs, AI model outputs, etc. In various embodiments, the behind-the-meter controllable loads allow an energy producer to increase size and performance of the RES. For example, the RES may be built to generate a larger capacity than what the RES can provide to the grid. This provides economy of scale cost and performance advantages over an oversized system without the behind-the-meter controllable loads. When generation is not at peak (e.g. clouds or early morning or late afternoon or low wind etc.) or when the energy storage system included with the RES is full, the excess energy is absorbed by the grid in addition to the ESS and controllable loads. Also, when RES generation is low and the delta between energy supply and demand on the grid is low, the oversized system can deliver more power to more critical or valuable loads on the grid using the stored charge on the ESS and fulfill the bandwidth of what the RES can provide to the grid. As such, the RES-ESS-CL system may be designed for better performance and lower cost, i.e., overall system performance is better such that a more consistent energy supply, capacity, or other ancillary services are provided to the new behind-the-meter loads and the grid by acting as a peaker plant.

In various embodiments of the present disclosure, the controller may include a predictive algorithm such as, for example, model predictive control (MPC), model-based reinforcement learning (MBRL), adaptive model predictive control (AMPC) or other predictive algorithm/machine learning algorithm. MPC may be implemented with a long short-term memory (LSTM), state space model, or transformer architecture. Some embodiments may use a multimodal time-series forecasting model (e.g., accounting for weather, wind production, solar production, grid demand, and value of behind-the-meter load outputs), examples including: autoregressive-moving-average (ARMA) models (e.g., Seasonal ARIMA); autoregressive integrated moving average (ARIMA) model; generalized autoregressive conditional heteroskedasticity (GARCH) models; vector autoregression models, Holt-Winters exponential smoothing; state space models; and Kalman filters. The predictive algorithm may predict a priority in a future time interval, and based on the prioritization and total predicted energy storage and generation, the predictive algorithm may determine any demand adjustments on the controllable loads and allocate energy and power to the various loads (on or off the grid) or the ESS (on or off the grid) based on a prioritization and other constraints.

The controller may include predictive and machine learning algorithms for balancing energy distribution to the controllable loads. For example, the energy generation and distribution controller may ingest data from various data sources (e.g., a weather forecast, an event schedule, a calendar, historical energy use data, sensor data or other data sources that would be apparent to one of skill in the art in possession of the present disclosure). In other embodiments, the data sources may include state of charge data or analytics of other RES and their ESS or standalone ESSes. These other RESes may include energy storage systems that are not on the network and may be those of competitors or grid resources. As such, a prediction of how much energy storage another RES provides may be beneficial as to anticipate how much energy will be available for the grid at a certain time so that control of the ESSs, controllable loads, or even controllable RESes (e.g., a hydro plant) can be managed.

The controller, using the predictive/ML algorithms, trained on historical or simulator data, may then anticipate energy demand, grid operating parameters, for uncontrollable loads on the grid as well as an energy supply on the power plants. Based on the anticipated energy demand and the energy supply and operating parameters of the grid, the controller may determine whether one or more energy balancing conditions associated with a respective controllable load are satisfied to either increase power distribution to that controllable load or reduce power distribution to that controllable load. For example, in exchange for a better rate on its energy price or some other energy distribution factor that the controllable load desires, the controllable load may allow controller to reduce energy consumption at that controllable load to reallocate the RESes or ESSes energy supply to loads that are not controllable and that may pay a higher premium or are higher prioritized based on various factors (e.g., more necessary infrastructure such as a hospital, a water distribution plant, critical communication infrastructure, or the like). Furthermore, the controllable loads themselves may be adjusted to reduce or increase energy consumption.

In some embodiments, where the controllable load includes a plurality of controllable loads, the controller and its machine learning/predictive algorithms may efficiently balance the controlling of the loads when power capacity is needed from the controllable load to charge the ESS or to provide power to the grid. For example, the controllable loads may include an AI training data center, a cryptocurrency mining center, and/or a vertical farm. These controllable loads may have load profiles (e.g., net load profiles) that can be operated/controlled in a manner that further optimizes the operation and efficiency of each individual CL while the combined load of the CLs presents a load profile to the grid that is more favorable (e.g., in terms of electric grid stability, POGI utilization efficiency, the behind-the-meter combined RES-ESS-CL system asset utilization, electric grid ancillary services efficiency and effectiveness provided by the RES-ESS-CL, energy price minimization, and/or etc.) than would exist if each CL were individually and independently controlled.

For example, the cryptocurrency mining may fluctuate with the weather as the computers performing the mining may be operating continuously while the cooling of the computers may fluctuate with the outside temperature. The data center may experience a similar profile to that of the cryptocurrency miner while the vertical farm may have a profile of several hours of lower energy needs when dark cycles for the plants are needed. By the controller anticipating the amount of power that the aggregated controllable load requires to be reduced and when, the controller can intelligently select which controllable load or loads to send instructions for reduction of power demand. In some embodiments, the controller may be aware of various processes that are occurring at the controllable load. For example, a data center may be conducting a time consuming process that takes hours or days to complete as well as processes that are less than a second, seconds, minutes or other short time interval with respect to the grid demand where the machine completing those process may be instructed to idle or consume less power while the machines that are performing the "long" processes remain running. However, in other embodiments, the controller may determine, at a high level, which controllable loads should have their power consumption reduced or increased, provide instructions to those controllable loads, and the controllable loads themselves may have intelligent algorithms to determine which process running on those controllable loads may be reduced or increased based on the parameters provided by the controller of the RES-ESS-CL system.

Similarly, the controllable load may include an energy storage system where the controller may increase or decrease power distribution to the energy storage device. Furthermore, more optimal decisions can be made of which energy storage device in the ESS to store energy. For example, a zinc air battery, heat battery, pumped hydro, gravity energy storage, or hydrogen production facilities may be charged/powered when cheap power is available while a lithium-ion battery may be charged when more expensive power is available, faster response times are anticipated, higher round trip efficiency are beneficial, or when other beneficial conditions are present that would be apparent to one of skill in the art in possession of the present disclosure. As such, a type of energy storage device or other factors associated with the energy storage device may be used to determine when a particular energy storage device is to be charged or how much charge a particular energy storage device is to receive.

As mentioned above, the controllable loads may include their own ESSes. In some embodiments, those ESSes may include a BESS system. However, in other embodiments the controllable load may include other ESSes such as, for example, a heat or thermal storage battery, pumped hydro, gravity energy storage, hydrogen production facilities, or the like. In one example, the controllable load may be a data center, an AI training center, a cryptocurrency miner, or the like that generates a tremendous amount of heat during the operation of the servers performing the operation. To cool servers, these controllable loads also use power from the RES/ESS to cool the servers. In some instances, the controllable load may include a system that can convert the waste heat to cold air or ice that can be stored and then later used to cool the servers when power reduced at the controllable load. The controllable load may reduce the air conditioning used to cool the servers and allow the stored cooling medium to transfer heat from the servers to that cooling medium.

In other embodiments, the controller may also use the anticipated energy demand and the energy supply to balance the storage of energy generated by the RESs on associated batteries. For example, the controller may determine the amount of energy stored on each battery and how those batteries in the power plants are going to distribute the energy in an optimized manner. For example, to preserve the life expectancy of a battery, under normal conditions, that battery may not be completely filled or completely drained (e.g., the battery may be placed in a battery preservation mode) since completely charging and/or completely draining the battery can decrease the useful life expectancy of the battery. However, if the anticipated energy supply and demand indicate a condition where it is more beneficial to fully charge a battery or fully discharge a battery than to consider the life expectancy of the battery, the controller may cause the battery to be fully charged in anticipation of the future event. For example, if there is an anticipated event that requires a high demand of energy, the energy generation and distribution controller may fully charge the battery. In other embodiments, the controller may tier the batteries such that a first battery distributes energy based on a first condition, a second battery distributes energy based on a second condition, and a third battery distributes energy based on a third condition. These conditions may be prioritized based on different levels. For example, the third battery may only distribute energy if the price of energy is above a certain threshold or the discharge cycle times are long.

In yet other embodiments of the present disclosure, the energy generation and distribution controller may determine when to provide energy storage to power plants that are not included in the RESs such as power plants that are on the grid. The energy generation and distribution controller may determine conditions where the out-of-network power plant may store energy on the RES's batteries or other ESS. Using the anticipated energy demand and energy storage determinations made by the machine learning algorithms of the RES-ESS-CL controller, the RES-ESS-CL controller may determine when to purchase power from power plants on the grid, from the grid itself (e.g., via the energy marketplace), or provide storage for contracted out-of-network power plants. The RES-ESS-CL controller may communicate with an application located at the out-of-network power plant similarly to an application provided at the controllable loads and storage of the networked power plants. As such, the systems and methods of the present disclosure provide more optimal and consistent energy generation, storage, and distribution of energy generated by RESs by providing a baseload to one or more controllable load and acting as a peaker plant for the grid, which increases grid reliability while at the same time providing more consistent/higher capacity factor for the "new" loads seen entering the grid.

FIG. 1 illustrates an example twin-mode power generation, storage, and distribution system 100 in accordance with one or more embodiments. While described herein as a "twin"-mode, the inventors of the present disclosure recognize that additional modes may be included, optionally operating simultaneously or overlapping in time, or fewer modes may be operating simultaneously than two. The energy generation, storage, and twin-mode power generation, storage, and distribution system 100 may include a controller 102; a network 104; an RES-ESS-CL system 106 that includes one or more RESes 109, one or more ESSes 107, one or more non-renewable energy sources (NRESes) 113, one or more controllable loads 108, one or more inverters 116, one or more inverters 118, and optionally one or more inverters 119 (e.g., when the NRESes 113 do not have built-in inverter(s) or output AC power directly); an electric grid 110; one or more power data sources 111; one or more conventional loads (e.g., a load 114a and/or a load 114b); one or more controllable load(s) 114c that are in-front-of-the-meter, one or more RESes 120, and one or more ESSes 122. The one or more NRESes 113 can include, for example, one or more diesel, gasoline, hydrogen, heavy fuel oil, jet fuel, or other types of fuel generators (which may or may not include their own associated, built-in inverters) and/or one or more gas turbine generators (which may or may not include their own associated, built-in inverters). While some components are listed and illustrated as one or more in number, other components that are illustrated as individual components may include more than one of those components. Also, herein, while a component may include one or more, for ease of discussion, the component may be described as one component (e.g., one or more controllable loads 108 may simply be described as a controllable load for discussion purposes).

The load 114a, the load 114b, the controllable load(s) 114c, one or more NRESes 124, RES 120 and ESS 122 may be electrically coupled to the electric grid 110. The one or more NRESes 124 can include, for example, one or more gas turbines and/or one or more diesel generators. The controllable load(s) 114c may be paired with/electrically coupled to the one or more NRESes 124 (e.g., such that the one or more NRESes can serve, for example, as backup energy sources for the controllable load(s) 114c). The load 114a, the load 114b, the one or more NRESes 124 and/or the controllable load(s) 114c may be remote from each other and have separate power requirements. The load 114a may have a first power delivery profile which details power requirements for the load 114a at different times. The load 114b may have a second power delivery profile which details power requirements for the load 114b at different times. The controllable load(s) 114c may have a third power delivery profile which details power requirements for the controllable load(s) 114c at different times. In some embodiments, the electric grid 110 may be a utility grid owned and operated by a single utility or system operator. In other embodiments, the electric grid 110 may be a plurality of electrical connections allowing for the transmission of power from the RES-ESS-CL system 106 to the load 114a, the load 114b, and the controllable load(s) 114c. In some embodiments, the electric grid 110 may include a micro-grid or micro-utility (e.g., a self-sustained grid) that creates its own grid with customers. For example, a village in Africa or an island has its own utility with paying customers.

The RES 109 may include a first renewable energy power plant (REPP). Examples of REPPs include, but are not limited to, solar plants, wind plants, geothermal plants, and biomass plants. However, the RES 109 may include multiple REPPs. A portion of the multiple REPPs may be of a first type of REPP (e.g., multiple solar plants), another portion of the multiple REPPs may be a of a second type (e.g., multiple wind turbines), yet another portion of the multiple REPPs may be of a third type and up to a nth type. The RES-ESS may include an energy storage system (ESS) 107. An example of an ESS is a battery. A battery-based ESS may be called a battery ESS or BESS. As discussed above, the ESS may include a heat or thermal storage battery, pumped hydro, gravity energy storage, hydrogen production facilities, or other energy storage systems that would be apparent to one of skill in the art in possession of the present disclosure. The RES 109 may have a first power output that varies over time. The multiple REPPs of different types may share the ESS or have separate ESSes or a combination of shared and dedicated ESSes. In various embodiments, a ratio of the power generated by the RES 109 to the power limit of the POGI may be any ratio greater than 2 (e.g., can be a ratio of 3, 4, 5, or 6). For example, the power generated by the RES 109 can be between about 3 and about 6 times the power limit of the POGI, since the RES 109 size is not limited to the POGI because the controllable loads 108 behind-the-meter may allow the RES 109 to upsize in scale. The ratio may be optimized based on the controllable loads, the type or types of RESes and the ESS as well as grid energy consumption and generation such that a high capacity factor is achieved for the RES-ESS-CL system 106 with minimal energy curtailment. As an example, for a solar PV RES in areas with sunshine where the natural capacity factor of the sun is between about 15% (e.g., northern Europe or Canada) and about 30% (e.g., northern Africa or southwestern US deserts), the higher ratios described herein allow the RES-ESS-CL system to have a higher asset utilization and increase the capacity factors (e.g., as measured relative to the POGI capacity, i.e., capacity factors of POGI utilization) substantially (e.g., capacity factors of about 60% to about 90%) when compared to a RES-ESS system with a POGI ratio of about 2 that has capacity factors of POGI utilization of about 35% to about 55%. Thus, while the RES 109 is built as a baseload for the controllable load 108, the entire RES-ESS-CL system 106 may operate as a twin-mode system where it has a dual purpose to (1) serve as a baseload for the controllable loads 108 or in some circumstances controllable load(s) 114c and (2) serve as a peaker plant for the electric grid 110 to provide power to the grid during times of high demand and low supply, and/or ancillary services, as well as an outlet to provide excess power generation when the ESS 107 and the controllable load 108 cannot consume any additional power. These modes may operate concurrently or separately.

In some embodiments, the RES 109 may be coupled to an inverter 116. The inverter 116 may convert DC power generated by the RES 109 to AC power provided to the electric grid 110 at a grid interconnection point. The grid interconnection point has a point of grid interconnect (POGI) limit. The inverter 116 may have an AC power output limit that is greater than the POGI limit. The RES-ESS-CL system 106 may include an inverter 118 that may be coupled between the ESS 107 and the electric grid 110 and coupled between the inverter 116 and the electric grid 110. The inverter 118 may be bidirectional such that it converts RES AC power outputted from the inverter 116 to DC power that can charge the ESS 107. Similarly, the inverter 118 may convert ESS DC power to AC power that can be outputted to the electric grid 110. The RES-ESS-CL system 106 may also include an inverter 119 that may be coupled between the NRES 113 and the electric grid 110, and the NRES 113 may be directly electrically coupled to the ESS 107 (e.g., such that the NRES 113 can be used to charge the ESS 107) and the controllable load(s) 108 (e.g., such that the NRES 113 can serve as a backup energy source for the controllable load 108). In various embodiments, the inverter 118 may be optionally built to have an AC power output that is greater than the POGI. In some embodiments, the inverter 118 may be a bi-directional inverter and receive grid AC power from the electric grid 110 and convert the grid AC power to DC power that is used to charge the ESS 107 or power the controllable loads (or both). The controllable load 108 may be coupled between the inverter 116 and the electric grid 110 and the inverter 118 and the electric grid 110. In some embodiments, the controllable load 108 may be electrically coupled with the RES 109 or the ESS 107 directly such that it receives DC power from the RES 109 or the ESS without converting from DC to AC power and back again via inverters. In some embodiments, the electric grid 110 may provide power to the controllable load 108 so other inverters are bi-directional inverters (not illustrated) may be used to convert the AC power from the electric grid 110 to DC power supplied directly to the controllable load 108. However, it is envisioned that the controllable load may operate off of AC or DC power and require bi-directional inverters. Grid power 108 may be used by the controllable load 108 in times when the net load or price of power on the grid 108 is below a threshold. As such, using the inexpensive power on the electric grid 110 may conserve the power on the ESS 107 or the life span of the ESS 107 by only using the ESS 107 when conditions require it, and the excess renewable energy available on the electric grid 110, or inexpensive energy, or possibly negatively priced energy (i.e., when a customer is paid to consume electricity) on the electric grid 110 may also be used to charge the ESS.

In various embodiments, the controllable load 108 and the ESS 107 may have similar ratios of demand. For example, the ESS 107 may be sized to at least service the power interconnect of the controllable load 108. The RES 109 may be sized such that at peak production, the RES 109 may provide its power to the controllable load 108, the ESS 107, and the electric grid 110. For example, the POGI limit for the electric grid 110 may be 100 MW, the power connection limit for the controllable load 108 may be 200 MW, and the power connection for the ESS 107 may be 300 MW such that the ESS 107 may provide power to the electric grid 110 and the controllable load 108. Thus, the RES 109 may be oversized up to 600 MW, which is a 6× oversize to the POGI.

The RES-ESS-CL system 106 may communicate with the networked energy RES-ESS-CL controller 102 via a network 104. Similarly, the controllable load(s) 108 and 114c, the RESes 109 and 120, and the ESSes 107 and 122 may communicate with the RES-ESS-CL controller 102 via a network 104. Additionally, the ESS 122, ESS 107, RES 120 and/or RES 109 can communicate with the electric grid 110 via the network 104, for example using one or more supervisory control and data acquisition (SCADA) systems optionally residing on, accessible by, and/or operatively coupled to one or more of the ESS 122, ESS 107, RES 120 and/or RES 109. Additionally, the NRES 113 and/or NRES 124 can communicate with the electric grid 110 via the network 104. Additionally, the inverter 116, the inverter 118, and/or the inverter 119 can communicate with the RES 120, the RES 109, the ESS 107 and/or the ESS 122 via the network 104. Furthermore, the controller 102 may communicate with power data sources 111 via the network 104. The data sources may include sensors, weather data, local schedules, or any other system data or third-party information that would be apparent to one of skill in the art in possession of the present disclosure. The network 104 may be any local area network (LAN), wide area network (WAN) and/or satellite-based network. In some embodiments, the network 104 is the internet. In other embodiments, the network 104 is a private communications network. The RES-ESS-CL controller 102 may include a processor and a memory.

The RES-ESS-CL controller 102 may control the RES 109 and cause the RES 109 to direct power to the ESS 107, the controllable load 108, and the electric grid 110. The RES-ESS-CL controller 102 may also control the ESS 107 on when to charge or discharge power received from the inverter 118 from the RES 109 or in some embodiments from the electric grid 110. The RES-ESS-CL controller 102 may also control the power demand at the controllable load(s) 108 and 114c. While a specific system is described, one of skill in the art in possession of the present disclosure will recognize that other variations, components, multiple RESes, ESSs, and controllable loads may be contemplated without deviating from the scope of the present disclosure.

Although not explicitly shown in FIG. 1, multiple switches (e.g., electronic switches, low, medium or high voltage switches or smart controllable breakers) may be positioned throughout the system 100 at appropriate locations to facilitate selection and control (e.g., via controller 102) of various operational modes that can include, but are not limited to, one or more of: supplying electricity to the electric grid 110 from inverter 116 (or direct if the NRES has AC output), supplying electricity to the electric grid 110 from inverter 118, supplying electricity to the electric grid 110 from inverter 119, supplying electricity to the electric grid 110 from RES 120, supplying electricity to the electric grid 110 from ESS 122, supplying electricity to the electric grid 110 from NRES 113, supplying electricity to the electric grid 110 from NRES 124, powering controllable load(s) 108 using the electric grid 110, powering controllable load(s) 114c using the electric grid 110, powering load(s) 114a using the electric grid 110, and/or powering load(s) 114b using the electric grid 110.

In one or more implementations of the system 100 of FIG. 1, the controller 102 can be configured to dynamically control one or more other components of the system 100 of FIG. 1, e.g., in a manner that varies over time and/or automatically in response to/based on one or more user-provided instructions and/or AI model outputs). For example, the controller 102 can be programmed/configured to variously perform one or more of the following: control (e.g., increase, decrease, piecewise modify, etc.) a net load profile of the controllable load(s) 108 (including its subsystems, e.g. cooling systems for a data center); modify an operational mode of the controllable load(s) 108; modify a number of controllable loads 108 that are in operation for a given predefined interval of time; modify a distribution of load across multiple controllable loads 108 (e.g., in a uniform or non-uniform manner) for a given predefined interval of time; cause/control operation of the controllable load(s) 108 (and optionally of the NRES 113) while charging ESS 107 (e.g., with a predefined, modifiable charge rate/profile) and/or operating RES 109 (and/or RES 120) (with or without supplying power to the electric grid 110); cause/control operation of the controllable load(s) 108 (and optionally of the NRES 113) while discharging ESS 107 (e.g., with a predefined, modifiable discharge rate/profile) and/or operating RES 109 (and/or RES 120) and receiving power from the electric grid 110; cause/control operation of the controllable load(s) 108 while charging ESS 107 (e.g., with a static or dynamically adjusted charge rate), operating NRES 113 (if present) and/or operating RES 109 (and/or RES 120) (with or without supplying power to the electric grid 110); cause/control operation of the controllable load(s) 108 while discharging ESS 107 (e.g., with a predefined, modifiable discharge rate/profile), operating NRES 113 (if present) and/or operating RES 109 (and/or RES 120) and receiving power from the electric grid 110; cause/control operation of the controllable load(s) 108 and ESS 107 while operating NRES 113 (if present) and curtailing operations of RES 109 (and/or RES 120) (with or without supplying power to the electric grid 110); cause/control operation of the controllable load(s) 108 while placing portions or all of ESS 107 into an energy conservation mode (e.g., reducing parasitic loads and/or HVAC systems associated with ESS 107) and while operating NRES 113 (if present) and/or RES 109 (and/or RES 120) and receiving power from the electric grid 110; cause/control operation of the controllable load(s) 108 while placing ESS 107 into a frequency regulation services mode (with or without supplying power from the NRES 113 and/or the RES 109 to the electric grid 110); cause/control operation of the controllable load(s) 108 and RES 109 (and/or RES 120) while operating NRES 113 (if present) and charging ESS 107 (e.g., with a predefined, modifiable charge rate/profile) (with or without supplying power to the electric grid 110); cause/control operation of the controllable load(s) 108 while preventing operation of the RES 109 and optionally operating NRES 113 and optionally charging ESS 107 or discharging ESS 107 (with or without supplying power to the electric grid 110); or cause/control operation of the controllable load(s) 108 and RES 109 while operating NRES 113 (if present), discharging ESS 107 (e.g., with a predefined, modifiable discharge rate/profile), and receiving power from the electric grid 110.

In some embodiments, any two or more of the foregoing system operational regimes may be combined or concatenated, for example such that they are executed sequentially in time by the controller 102, e.g., as part of an electrical resource deployment schedule. Moreover, an ordering of such combination(s) of system operational regimes may vary over time (e.g., automatically via the controller 102, optionally dynamically and/or in response to an AI model output(s)). Resource deployment schedules can be specific to/unique to individual power plants within a system (e.g., a networked system) of power plants, each power plant including a system (e.g., system 100 of FIG. 1) of the present disclosure, and the resource allocation strategy implemented by each resource deployment schedule (for each power plant) can differ from the others, such that the overall resource allocation strategy reflected by the system of power plants is diversified.

In some embodiments, one or more of the foregoing system operational regimes may be selected by the controller 102 based on predictive analytics/analyses performed by one or more AI models. For example, predictions relating to one or more of weather, grid conditions, electricity demand information, load responses, and/or marketplace pricing for electricity services (e.g., including ancillary services) on/via the electric grid can be taken into account when generating and/or modifying the foregoing system operational regimes and/or the associated resource allocation strategies.

According to one or more embodiments of the present disclosure, by making "load" a variable (via the use and control of one or more CLs, as described herein), resource (e.g., energy resources and/or financial resources) allocation strategies that are more sophisticated and/or complex than those associated with known systems lacking a CL(s), e.g., facilitating more granular adjustments and optimizations. Moreover, resource allocation strategies not previously possible (e.g., in terms of flexibility, energy efficiency, cost-efficiency, size, scale, etc.) with known systems lacking a CL(s) can be developed/realized. By adding CL(s) to a RES-ESS system, the ability to optimize the overall performance of the system goes up/improves, from just one dimension of the RES-ESS system (e.g., where the ESS may be controllable) to a multi-dimensional control regime allowing for multi-dimensional optimization strategies, which may more than linearly improve system performance and facilitate the economically viable construction and operation of larger, more efficient, power systems/plants. For embodiments that include NRES(es), the controllability of the overall system can be further increased, such that system performance may be further enhanced and the size of the power system/plant that can be constructed and operated may be even larger.

Figure 2:
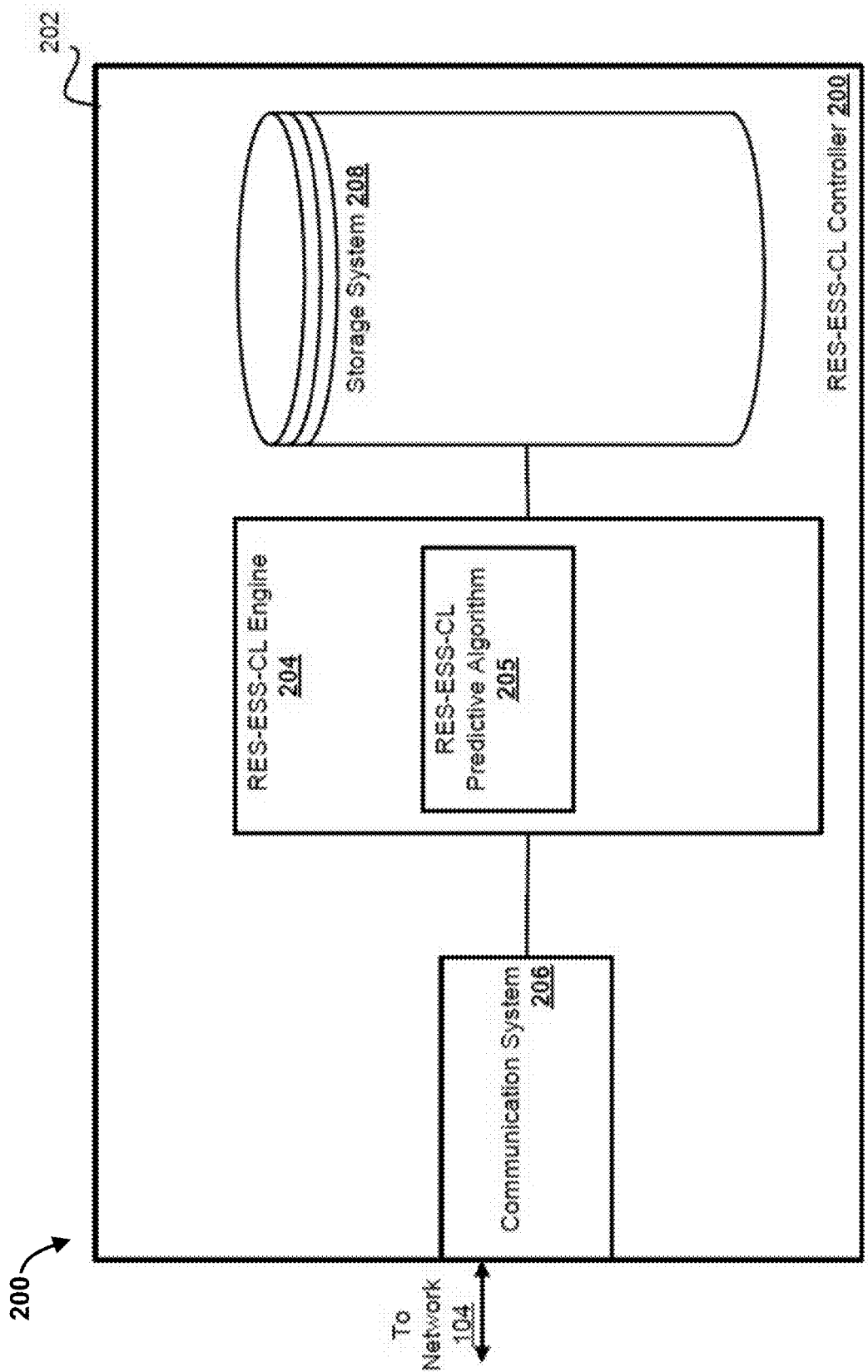
FIG. 2 is a schematic view illustrating an embodiment of a renewable energy source-energy storage system-controllable load RES-ESS-CL controller used in an RES-ESS-CL system of the twin-mode power generation, storage, and distribution system FIG. 1, in accordance with some embodiments of the present disclosure.

FIG. 2 of the present disclosure illustrates an embodiment of an RES-ESS-CL controller 200 that may be the RES-ESS-CL controller 102 discussed above with reference to FIG. 1. While described as a standalone system, those skilled in the art will appreciate that the RES-ESS-CL controller 200 may be distributed across many computing devices such as in a cloud environment. In the illustrated embodiment, the RES-ESS-CL controller 200 includes a chassis 202 that houses the components of the RES-ESS-CL controller 200, only some of which are illustrated in FIG. 2. For example, the chassis 202 may house a processing system (not illustrated) and a non-transitory memory system (not illustrated) that includes instructions that, when executed by the processing system, cause the processing system to provide an RES-ESS-CL engine 204 that is configured to perform the functions of the RES-ESS-CL engines or the RES-ESS-CL controller discussed below. In the specific example illustrated in FIG. 2, the RES-ESS-CL engine 204 may include an RES-ESS-CL predictive algorithm 205 that is configured to perform the functions of the RES-ESS-CL predictive algorithms discussed herein. In various embodiments, the RES-ESS-CL predictive algorithm 205 may ingest data provided by data sources and anticipates energy demand and energy supply, grid conditions, or any other functionality discussed herein. In various embodiments, the RES-ESS-CL predictive algorithm 205 may include a network simulator to model behavior, which may predict the components being incorporated into the grid by running simulations due to lack of historical data. In other examples, the RES-ESS-CL predictive algorithm 205 may include model predictive control or other predictive algorithms/machine learning algorithms that would be apparent to one of skill in the art in possession of the present disclosure.

The chassis 202 may further house a communication system 206 that is coupled to the energy generation, storage, and distribution engine 204 (e.g., via a coupling between the communication system 206 and the processing system) and that is configured to provide for communication through the communication network 104 as detailed below. The chassis 202 may also house a storage system 208 that is coupled to the RES-ESS-CL engine 204 through the processing system and that is configured to store the rules or other data utilized by the RES-ESS-CL engine 204 to provide the functionality discussed below. While an RES-ESS-CL controller 200 has been illustrated, one of skill in the art in possession of the present disclosure will recognize that other RES-ESS-CL controller (or other devices operating according to the teachings of the present disclosure in a manner similar to that described below for the RES-ESS-CL controller 200) may include a variety of components and/or component configurations for providing conventional computing device functionality, as well as the functionality discussed below, while remaining within the scope of the present disclosure as well.

Figure 3:
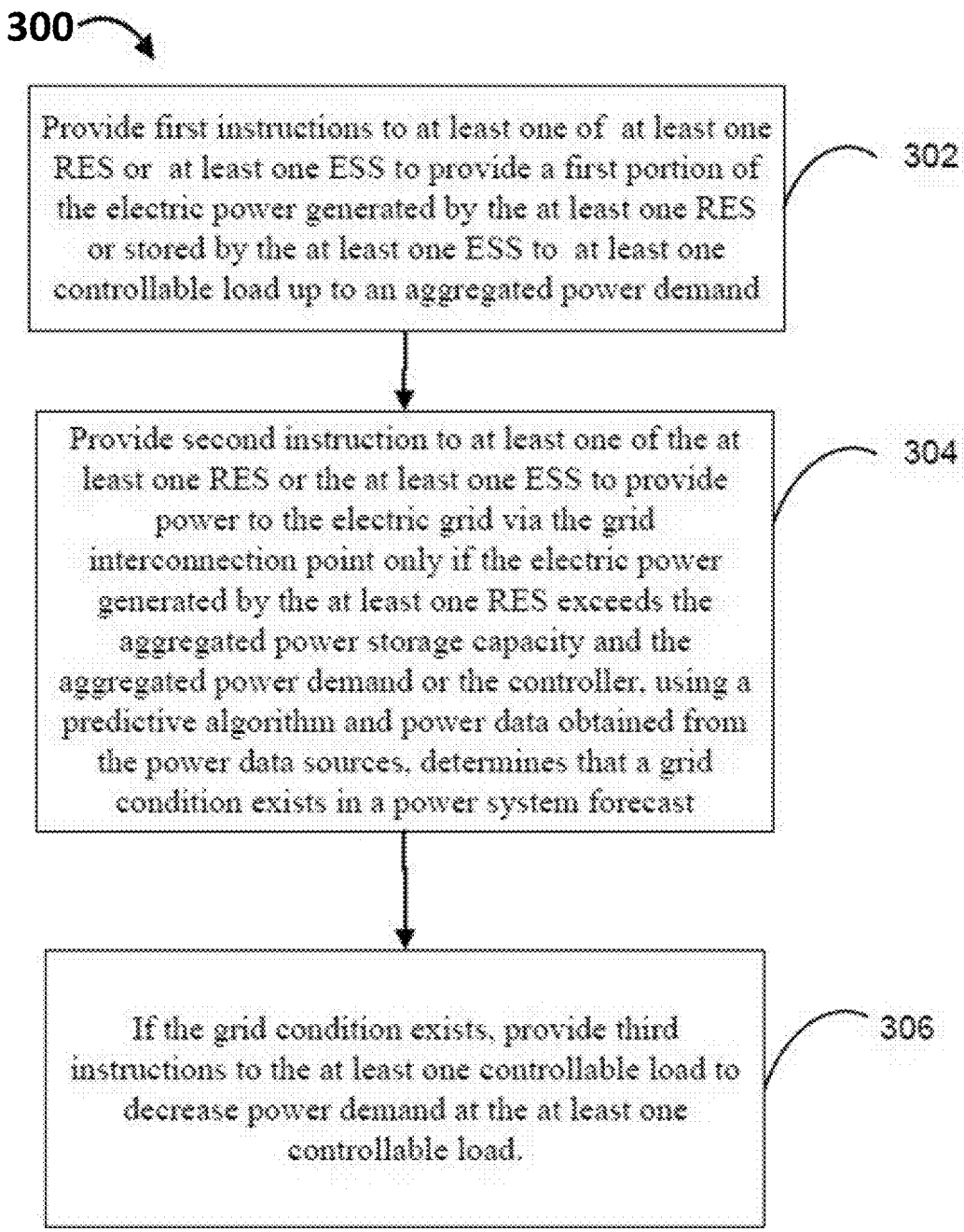
FIG. 3 illustrates a flowchart of the twin-mode power generation, storage, and distribution system of FIG. 1 serving as a baseload for one or more controllable loads and as a peaker plant for a grid, in accordance with some embodiments of the present disclosure.

FIG. 3 depicts an embodiment of a method 300 of renewable energy generation, storage, and distribution, which in some embodiments may be implemented with at least some of the components of FIGS. 1 and 2 discussed above. As discussed below, some embodiments make technological improvements to RES-ESS systems that are overbuilt (e.g., whereby the ESS component(s) can store excess capacity generated by the RES(es) and not otherwise consumed, supplied to the grid, etc.) and/or that otherwise provide a "twin-mode" system that serves a high capacity baseload for a controllable load (optionally in combination with providing auxiliary services) and as more of a peaker plant to the grid (optionally in combination with providing auxiliary services). Some or all of the steps of the method 300 may be performed by other actors in the energy generation, storage, and twin-mode power generation, storage, and distribution system 100 and still fall under the scope of the present disclosure. Furthermore, and as mentioned above, the RES-ESS-CL controller 102/200 may include one or more processors or one or more servers, and thus the method 300 may be distributed across the those one or more processors or the one or more servers.

The method 300 may begin at block 302 where first instructions are provided to at least one of at least one RES or at least one ESS to provide a first portion of the electric power generated by the at least one RES or stored by the at least one ESS to at least one controllable load up to an aggregated power demand.

The method 300 may proceed to block 304 where second instructions are provided to at least one of the at least one RES or the at least one ESS to provide power to the electric grid via the grid interconnection point only if the electric power generated by the at least one RES exceeds the aggregated power capacity of the ESS and the aggregated power demand or the controller using a predictive algorithm and power data obtained from the power data sources, determines that a grid condition exists in a power system forecast (e.g., a forecast or prediction specifying one or more of: electricity demand, electricity availability, grid capacity, grid availability and grid congestion, or pricing of electricity or pricing of ancillary services over a given time/during a predefined period of time).

The method 300 may proceed to block 306 where if the grid condition exists, provide third instructions to the at least one controllable load to decrease power demand (or, optionally, to increase power demand) at the at least one controllable load. Thus, the twin-mode power generation, storage, and distribution system may provide, at a first time and by at least one of the RES 109 or the ESS 107, power to at least one of a POGI to the grid 110 or at least one controllable load 108 that is behind-the-meter. At a second time, power may be received from the POGI to at least one of the ESS 107 or the at least one controllable load. At the second time, power may also be provided from at least one of the RES 109 or the ESS 107 to the controllable load 108 or power may be provided from the RES 109 to the ESS 107. At a third time, no power may be provided or received via the POGI and power may be provided from at least one of the ESS 107 to the controllable load 108, the RES 109 to the controllable load 108, or from the RES 109 to the ESS 107.

As such, the grid 110 is typically provided with power when there is high demand for power on the grid (which usually coincides with peak prices). This may occur only 1%-10% of the time but other percentages are contemplated. As such, the RES-ESS-CL system 106 may act as a peaker plant in some cases and as a baseload for the controllable load 108. Thus, the grid 110 may be used for only making money when prices are peak or to avoid curtailing energy within the RES-ESS-CL system 106. When prices are low on the grid 110, the RES-ESS-CL controller 102 may instruct for the controllable load 108 to consume power from the grid 110 that may be cheaper such as nighttime generated wind power. Thus, systems and methods of the present disclosure provide a primary customer with behind-the-meter load to get high capacity factor. Now with networking added an approximately 3× or even higher over capacity may be built. This overcomes the typical 2× overbuilds in overbuilt RES-ESS systems, which allows for more efficient systems with a twin-mode base load and peaker plant configuration.

Figure 4:
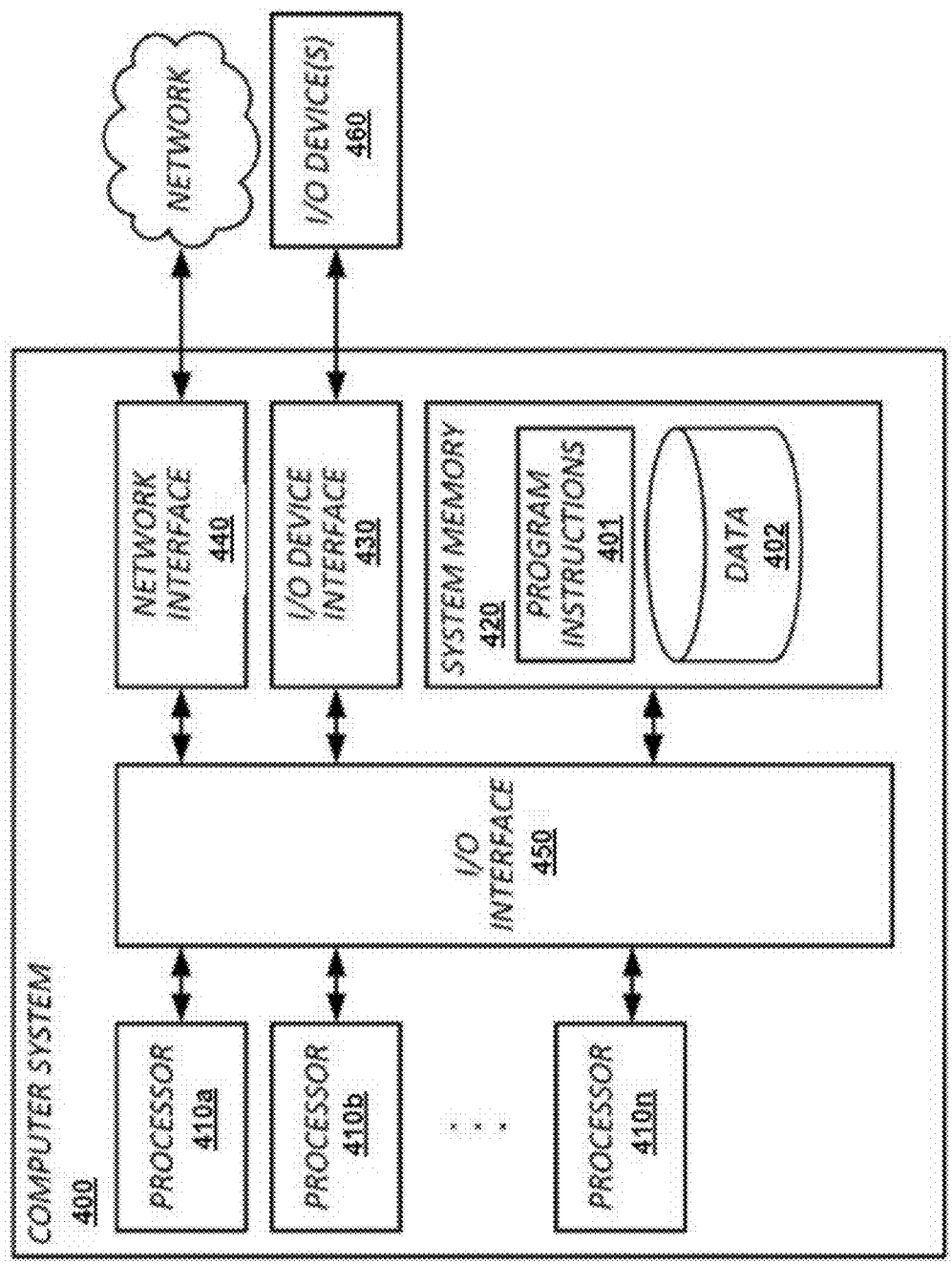
FIG. 4 shows an example of a computing device by which the present techniques may be implemented, in accordance with some embodiments of the present disclosure.

FIG. 4 is a diagram that illustrates an exemplary computing system 400 in accordance with embodiments of the present technique. Various portions of systems and methods described herein, may include or be executed on one or more computer systems similar to computing system 400. For example, the networked energy generation, storage, and distribution RES-ESS-CL controller 102/200, the power plant 106a, the power plant 106b, the controllable load 108a, the controllable load 108b, the power plant 112 and the controllable load(s) 114c may include the computing system 400. Further, processes, operations, services, and modules described herein may be executed by one or more processing systems similar to that of computing system 400.

Computing system 400 may include one or more processors (e.g., processors 410a-410n) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a uni-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computer system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computer system 400 through a wired or wireless connection. I/O devices 460 may be connected to computer system 400 from a remote location. I/O devices 460 located on remote computer system, for example, may be connected to computer system 400 via a network and network interface 440.

Network interface 440 may include a network adapter that provides for connection of computer system 400 to a network. Network interface 440 may facilitate data exchange between computer system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 401 or data 402. Program instructions 401 may be executable by a processor (e.g., one or more of processors 410a-410n) to implement one or more embodiments of the present techniques. Instructions 401 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 400 or multiple computer systems 400 configured to host different portions or instances of embodiments. Multiple computer systems 400 may provide for parallel or sequential processing/execution of one or more portions of the techniques described herein.

Those skilled in the art will appreciate that computer system 400 is merely illustrative and is not intended to limit the scope of the techniques described herein. Computer system 400 may include any combination of devices or software that may perform or otherwise provide for the performance of the techniques described herein. For example, computer system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Figure 5:
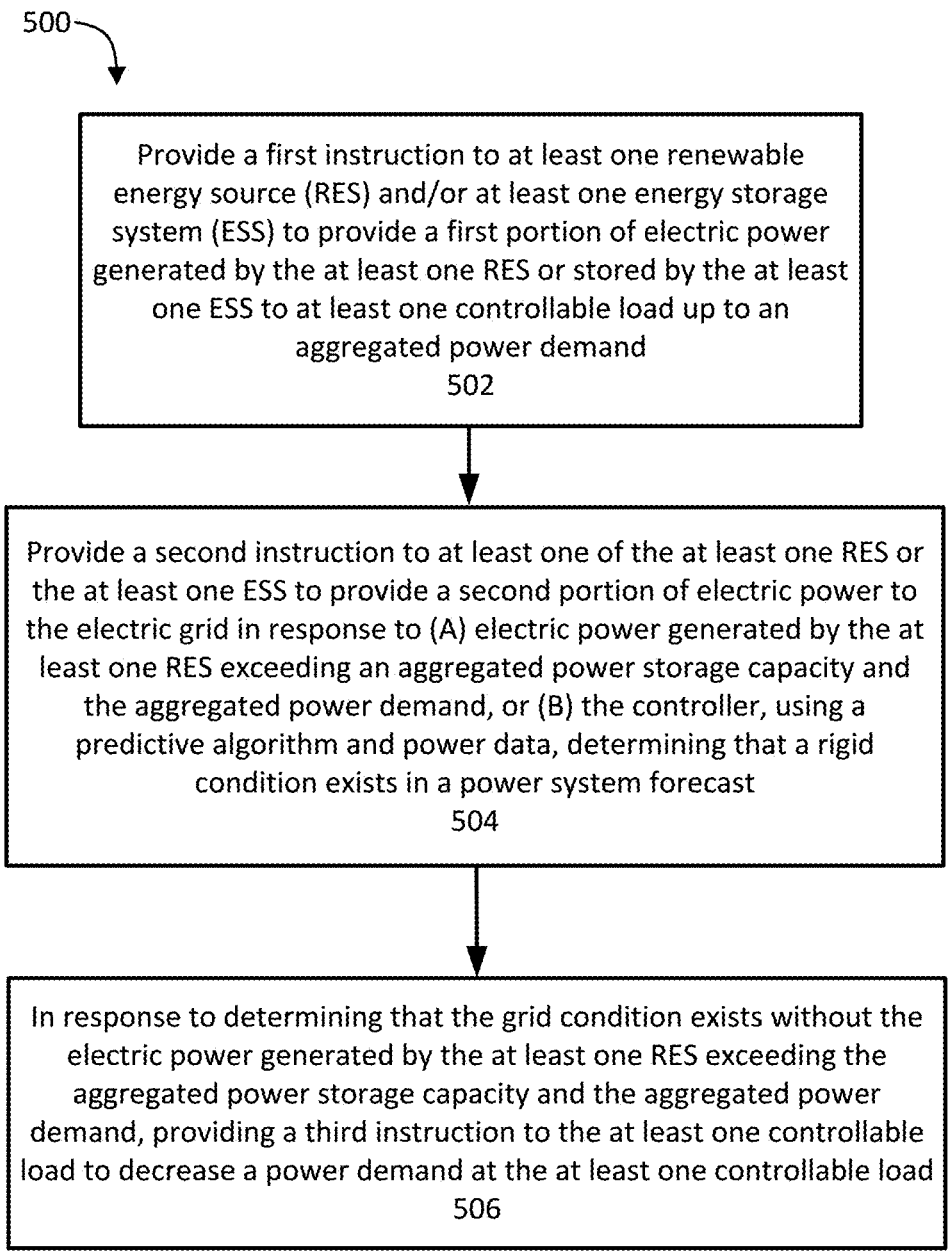
FIG. 5 is a flow diagram showing a first method for controlling a power generation, storage, and distribution system, in accordance with some embodiments.

FIG. 5 is a flow diagram showing a first method for controlling a power generation, storage, and distribution system, in accordance with some embodiments. The method 500 of FIG. 5 may be performed using the system 100 of FIG. 1, the system 200 of FIG. 2, and/or the computer system 400 of FIG. 4. For example, method 500 of FIG. 5 can be performed using a system that includes at least one renewable energy source (RES), at least one energy storage system (ESS), and a controller. The at least one RES may be configured to electrically couple to a grid interconnection point of an electric grid, and an aggregated power output capacity of the at least one RES may exceed a point of grid interconnect (POGI) limit of the grid interconnection point. The at least one ESS can be electrically coupled to the grid interconnection point and the at least one RES. The at least one ESS can have an aggregated power capacity that is less than the aggregated power output capacity of the at least one RES. The controller can be communicatively coupled with the at least one controllable load, the at least one ESS, and the at least one RES. The controller can be configured to perform the method 500 of FIG. 5 by providing, at 502, a first instruction to at least one of the at least one RES or the at least one ESS to provide a first portion of electric power generated by the at least one RES or stored by the at least one ESS to at least one controllable load up to an aggregated power demand. The controller can also be configured to provide, at 504, a second instruction to at least one of the at least one RES or the at least one ESS to provide a second portion of electric power to the electric grid in response to (A) electric power generated by the at least one RES exceeding an aggregated power capacity and the aggregated power demand, or (B) the controller, using a predictive algorithm and power data, determining that a grid condition exists in a power system forecast. The controller can also be configured to provide, at 506 and in response to determining that the grid condition exists without the electric power generated by the at least one RES exceeding the aggregated power capacity and the aggregated power demand, a third instruction to the at least one controllable load to decrease a power demand (or, alternatively, to increase a power demand) at the at least one controllable load.

In some implementations of method 500, the aggregated AC power output capacity of the at least one RES exceeds the POGI limit by a factor of at least about 1.3.

In some implementations of method 500, the grid condition is associated with at least one of a price of power associated with the electric grid, a demand for power from the electric grid, a temperature associated with the grid, an operating conditions associated with the grid, a price of ancillary services associated with the electric grid, a curtailment order associated with the electric grid, a congestion price associated with the electric grid, or a decongestion value associated with the electric grid. Alternatively or in addition, the grid condition can include or be associated with a relative value of energy for a given location, day and/or time (e.g., a value of energy to power an air conditioner on a hot day may be higher than a value of that energy on a cool day). A grid condition may be determined to exist when one or more of the following exceeds a predefined maximum threshold value, is below a predefined minimum threshold value, falls within a predefined threshold range, or falls outside a predefined threshold range: a price of power associated with the electric grid, a demand for power from the electric grid, a temperature associated with the grid, an operating conditions associated with the grid, a price of ancillary services associated with the electric grid, a congestion price associated with the electric grid, or a decongestion value associated with the electric grid. As used herein, a curtailment associated with the electric grid can refer to a deliberate reduction in power output below what could have been produced, and can occur, by way of non-limiting example, in response to an emergency condition, or according to a predefined schedule, or as a measure to balance energy supply and demand resulting from transmission or generation constraints.

In some implementations of method 500, the controller is further configured to operate the at least one RES or the at least one ESS as at least one of a peaker plant for the electric grid or a provider of ancillary services to the electric grid, and the grid condition is associated with at least one of a price of power associated with the electric grid, a price of ancillary services associated with the electric grid, a curtailment associated with the electric grid, a congestion price associated with the electric grid, or a decongestion value associated with the electric grid.

In some implementations of method 500, the at least one controllable load includes a plurality of controllable loads, and the controller is further configured to provide instructions to the plurality of controllable loads to balance an energy distribution associated with the plurality of controllable loads.

In some implementations of method 500, the at least one controllable load (CL) includes a data center. Alternatively or in addition, the at least one controllable load can include one or more of: an artificial intelligence (AI) training center, a cryptocurrency miner, an electric vehicle (EV) charging station, a vertical farm, a hydrogen production facility (e.g., an electrolyzer), a smelter, water treatment plant (including desalination and purification), an industrial process heater, or a thermal battery.

In some implementations of method 500, the controller is configured to select the first instruction such that a correlation of the at least one controllable load with the electric grid is one of reduced or increased in response to the first instruction or in response to the at least one controllable load executing the first instruction. For example, when the net load on the electric grid is below a certain threshold, e.g., the grid is getting close to an overgeneration condition bringing the electric grid close to an unstable condition, or when energy prices are negative, the first instruction may result in more energy being consumed by the controllable load. Alternatively or in addition, in some implementations of method 500, the controller is configured to select the first instruction such that a correlation of (1) at least one peak of a net load profile associated with the at least one controllable load, with (2) at least one peak of a net load profile associated with the electric grid is reduced in response to the first instruction or in response to the at least one controllable load executing the first instruction.

In some implementations of method 500, the first instruction is configured to cause a reduction in a correlation of the at least one controllable load with the electric grid in response to the first instruction or in response to the at least one controllable load executing the first instruction. Optionally, one or more correlations described herein is associated with a predefined time period.

In some implementations of method 500, the controller is further configured to cause delivery of power from the electric grid to the at least one controllable load.

In some implementations of method 500, a load profile of the at least one controllable load can be controlled to be less correlated with a load profile of the electric grid. In some implementations of method 500, a load profile of the at least one controllable load differs from a load profile of at least one additional load electrically coupled to the electric grid.

In some implementations of method 500, a correlation of a net load profile of the at least one controllable load to a net load profile of the electric grid can be reduced or otherwise changed during peak price times and increased during times when the grid energy prices are low.

In some implementations of method 500, the system is configured to: (1) operate in a first mode as one of a baseload, a semi-baseload, or a peaker plant for the at least one controllable load, and (2) concurrently with operating in the first mode, operate in a second mode as a peaker plant for the electric grid.

In some implementations of method 500, the system (e.g., the system 100 of FIG. 1, the system 200 of FIG. 2, and/or the computer system 400 of FIG. 4) has an associated capacity factor of at least about 60%, or at least about 65%, or at least about 70%, or at least about 75%, or at least about 80%, or at least about 80%, or at least about 85%, or at least about 90%, or at least about 95%, or approaching about 100%, or between about 60% and about 90%, or between about 50% and about 80%, or between about 70% and about 90%, or between about 75% and about 95% or between 80% and about 100%.

In some implementations of method 500, a ratio of the power generated by the at least one RES to an aggregate load of the at least one controllable load is between about 3 and about 6, or is between about 4 and about 7, or is between about 3 and about 9, or is between about 6 and about 9, or has a value of about 3, or has a value of about 4, or has a value of about 5, or has a value of about 6, or has a value of about 7, or has a value of about 8, or has a value of about 9, or has a value of about 10.

In some implementations of method 500, the controller is further configured to provide a fourth instruction to at least one non-renewable energy source (NRES) to cause the at least one NRES to provide a third portion of electric power generated by the at least one NRES to the at least one controllable load, in a behind-the-meter manner and/or via direct access.

Figure 6:
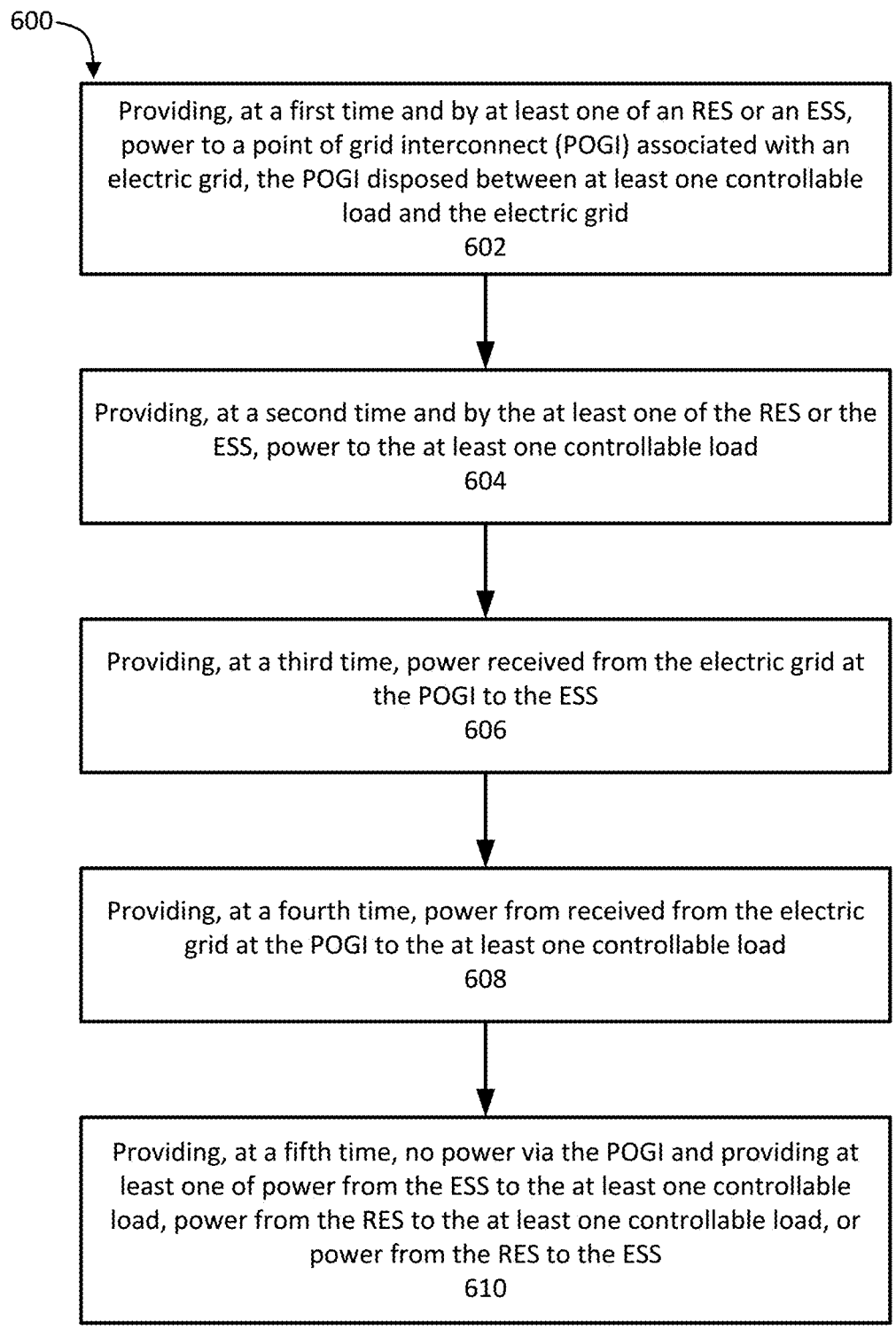
FIG. 6 is a flow diagram showing a second method for controlling a power generation, storage, and distribution system, in accordance with some embodiments.

FIG. 6 is a flow diagram showing a second method for controlling a power generation, storage, and distribution system, in accordance with some embodiments. The method 600 of FIG. 6 may be performed using the system 100 of FIG. 1, the system 200 of FIG. 2, and/or the computer system 400 of FIG. 4. As shown in FIG. 6, the method 600 includes providing, at 602, at a first time and by at least one of a renewable energy source (RES) or an energy storage system (ESS), power to a point of grid interconnect (POGI) associated with an electric grid, the POGI disposed between at least one controllable load and the electric grid. The method 600 also includes providing, at 604 and at a second time and by the at least one of the RES or the ESS, power to the at least one controllable load. The method 600 also includes providing, at 606 and at a third time, power received from the electric grid at the POGI to the ESS. The method 600 also includes providing, at 608 and at a fourth time, power from received from the electric grid at the POGI to the at least one controllable load. The method 600 also includes providing, at 610 and at a fifth time, no power via the POGI and providing at least one of power from the ESS to the at least one controllable load, power from the RES to the at least one controllable load, or power from the RES to the ESS.

In some implementations, the method 600 also includes providing, at the fourth time, power from at least one of the RES or the ESS to the at least one controllable load.

In some implementations, the method 600 also includes providing, at the fourth time, power from the RES to at least one of the ESS or the at least one controllable load.

In some implementations of the method 600, the providing at the fifth time includes providing (1) power from the ESS to the at least one controllable load, and (2) one of: power from the RES to the at least one controllable load or power from the RES to the ESS.

In some implementations of the method 600, the providing at the fifth time includes providing (1) power from the RES to the at least one controllable load, and (2) one of: power from the ESS to the at least one controllable load or power from the RES to the ESS.

In some implementations of the method 600, the method also includes providing, at a sixth time, power from at least one non-renewable energy source (NRES) to the at least one controllable load.

In some implementations of the method 600, the providing at the fifth time includes providing (1) power from the RES to the ESS, (2) power from the RES to the at least one controllable load, and (3) power from the ESS to the at least one controllable load.

Figure 7:
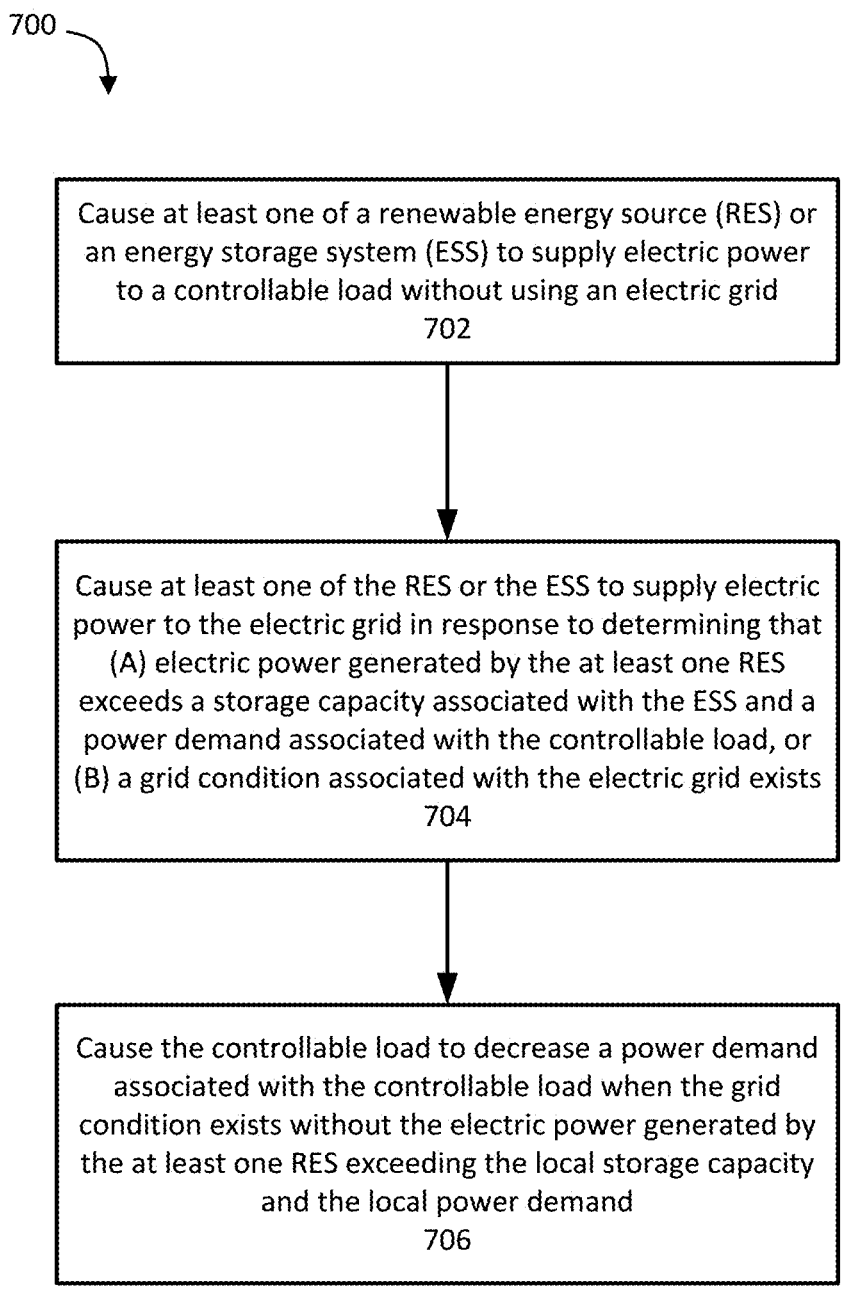
FIG. 7 is a flow diagram showing a third method for controlling a power generation, storage, and distribution system, in accordance with some embodiments.

FIG. 7 is a flow diagram showing a third method for controlling a power generation, storage, and distribution system, in accordance with some embodiments. The method 700 of FIG. 7 may be performed using the system 100 of FIG. 1, the system 200 of FIG. 2, and/or the computer system 400 of FIG. 4. As shown in FIG. 7, the method 700, which may be implemented via processor-executable instructions that are stored in/on a non-transitory, processor-readable medium, includes causing, at 702, at least one of a renewable energy source (RES) or an energy storage system (ESS) to supply electric power to a controllable load without using an electric grid. The method 700 also includes, at 704, causing at least one of the RES or the ESS to supply electric power to the electric grid in response to determining that (A) electric power generated by the at least one RES exceeds a storage capacity associated with the ESS and a power demand associated with the controllable load, or (B) a grid condition associated with the electric grid exists. The method 700 also includes, at 706, causing the controllable load to one of decrease or increase a power demand associated with the controllable load when the grid condition exists without the electric power generated by the at least one RES exceeding the local storage capacity and the local power demand. Alternatively or in addition, in some implementations (not shown), the method 700 can include increasing a power demand at the at least one controllable load in response to detecting/determining that the ESS has reached a storage limit and/or in response to a prediction that the ESS will reach a storage limit at a future time (e.g., at a time when the ESS is predicted to next reach a storage limit without providing energy to the at least one controllable load), such that excess energy can be utilized by the at least one controllable load (e.g., to perform pre-cooling for a data center).

In some implementations of the method 700, the controllable load includes a data center. Alternatively or in addition, the controllable load can include one or more of: an artificial intelligence (AI) training center, a cryptocurrency miner, an electric vehicle (EV) charging station, a vertical farm, a hydrogen production facility, a smelter, water treatment plant (including desalination and purification), an industrial process heater, or a thermal battery.

In some implementations of the method 700, a net load profile of the at least one controllable load is not substantially correlated with a net load profile of the electric grid during times when the electric grid is above a high threshold of net load or below a low threshold of net load.

In some implementations of the method 700, a net load profile of the at least one controllable load is substantially correlated inversely with a net load profile of the electric grid during times when the electric grid is above a high threshold of net load or below a low threshold of net load.

In some implementations of the method 700, a peak(s) of a load profile of the at least one controllable load does not correlate with, does not coincide with, or does not overlap with a peak(s) of a load profile of at least one additional load electrically coupled to the electric grid.

In some implementations of the method 700, the instructions to cause the at least one of the RES or the ESS to supply electric power to the controllable load include instructions to supply electric power to the controllable load concurrently with the causing of the at least one of the RES or the ESS to supply power to the electric grid.

In some implementations, the non-transitory, processor-readable medium also stores instructions that, when executed by the processor, cause the processor to cause delivery of power from the electric grid to the controllable load.

In some implementations, the non-transitory, processor-readable medium also stores instructions that, when executed by the processor, cause the processor to balance an energy distribution associated with a plurality of controllable loads that includes the controllable load.

In some implementations, the non-transitory, processor-readable medium also stores instructions that, when executed by the processor, cause the processor to switch between or concurrently operate (1) a first mode in which the at least one of the RES or the ESS operates as a peaker plant or baseload for the electric grid, and (2) at least one further mode in which the at least one of the RES or the ESS operates as a baseload or peaker plant for the controllable load.

Figure 8:
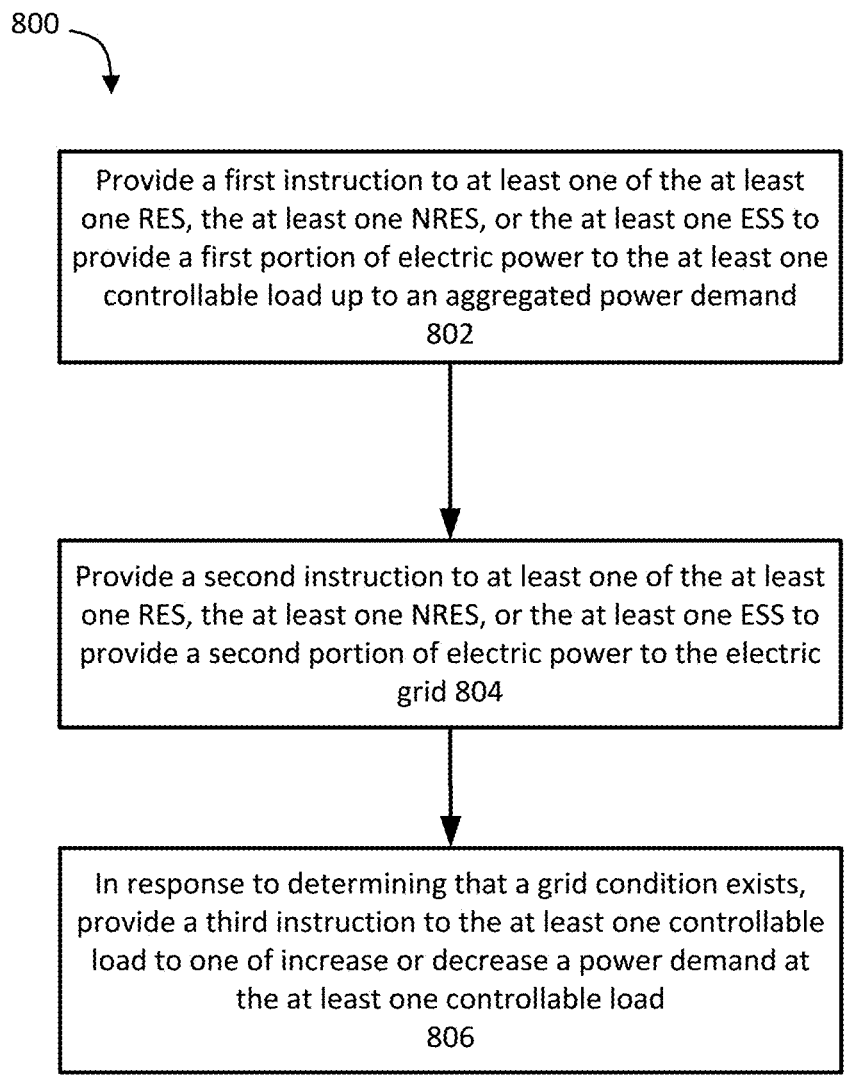
FIG. 8 is a flow diagram showing a fourth method for controlling a power generation, storage, and distribution system, in accordance with some embodiments.

FIG. 8 is a flow diagram showing a fourth method for controlling a power generation, storage, and distribution system, in accordance with some embodiments. In some such implementations, a system includes at least one renewable energy source (RES) configured to electrically couple to a grid interconnection point of an electric grid, at least one energy storage system (ESS) that is electrically coupled to the grid interconnection point and the at least one RES, at least one non-renewable energy source (NRES), and a controller that is communicatively coupled with at least one controllable load, the at least one ESS, the at least one NRES, and the at least one RES. The controller is configured to perform the method 800 of FIG. 8, which includes providing, at 802, a first instruction to at least one of the at least one RES, the at least one NRES, or the at least one ESS to provide a first portion of electric power to the at least one controllable load up to an aggregated power demand. The method 800 of FIG. 8 also includes providing, at 804, a second instruction to at least one of the at least one RES, the at least one NRES, or the at least one ESS to provide a second portion of electric power to the electric grid. The method 800 of FIG. 8 also includes, at 806 and in response to determining that a grid condition exists, providing a third instruction to the at least one controllable load to change (e.g., increase or decrease) a power demand at the at least one controllable load.

In some embodiments of the present disclosure, a correlation of a net load profile of at least one controllable load with a net load profile of the electric grid is less than about 0.1, or between about 0.1 and 0.2, or between about 0.05 and about 0.5, or between about 0.2 and about 0.5, or between about 0.2 and about 0.3, or between about 0.3 and about 0.5. The foregoing correlation values can be associated, for example, with a predefined time period or interval. The predefined time period or interval can be on the order of (e.g., having a timescale of) minutes (e.g., one minute, 5 minutes, 20 minutes, etc.), hours (e.g., 1 hour, 2 hours, between about 2 hours and about 10 hours, between about 4 hours and about 6 hours, etc.), days (e.g., 1 day, 2 days, between about 3 days and about 5 days, etc.), weeks, months, seasons (e.g., summer, winter, fall, spring), or years.

Figure 9A:
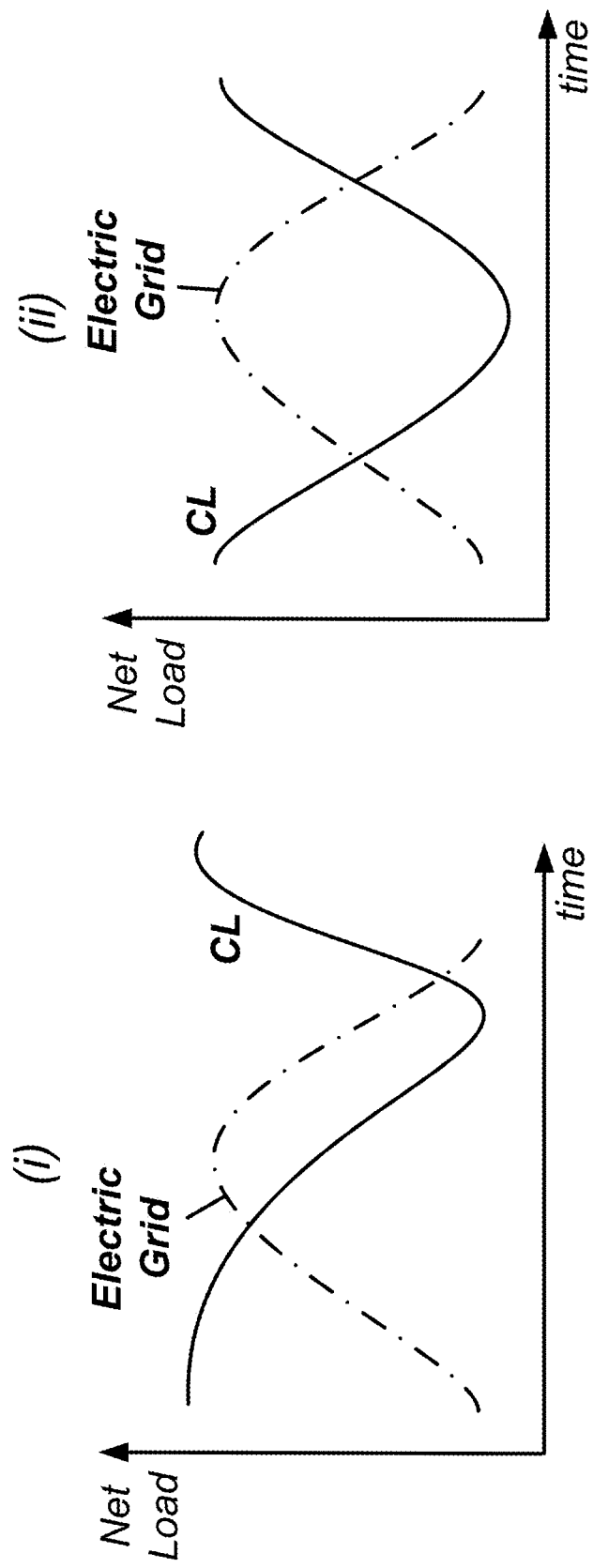
FIG. 9A is a first example set of plots comparing net load profiles for a controllable load and an electric grid, in accordance with some embodiments.

FIG. 9A is a first example set of plots comparing net load profiles (net load versus time) for a controllable load (CL) and for an electric grid, e.g., for a common time period, in accordance with some embodiments. The plots of FIG. 9A are not drawn "to scale" (e.g., the magnitude of the CL's net load, in practice, would typically be far lower than the magnitude of the electric grid's net load), but instead are scaled for readability. The plots of FIG. 9A can represent, for example, net load profiles for a CL that includes a vertical farm, desalination plant, or AI training facility. As can be observed in the lefthand plot (i) of FIG. 9A, a peak net load value of the electric grid (e.g., when demand for electricity from the grid is high and thus the associated cost of receiving power from the electric grid has reached a local or global maximum, for example at 5 pm PT) is aligned, timewise, with a relatively high level of demand for power for the vertical farm, desalination plant, or AI training facility. The righthand plot (ii) of FIG. 9A shows a remediated/optimized net load profile for the CL and the electric grid, e.g., as implemented by a system such as system 100 of FIG. 1 and/or using one or more methods described herein, where the peak net load value of the electric grid now substantially overlaps with or coincides with a minimum net load value for the CL during the observed time period. Additionally, the peak net load value of the CL has shifted towards a lower-valued portion of the electric grid's net load profile (e.g., where demand for electricity from the grid is low and thus the associated cost of receiving power from the electric grid trends toward a local or global minimum, for example at midnight). In other words, the correlation between the net load profile of the electric grid and the net load profile of the CL has been modified such that there is a substantially inverse correlation between the net load profile of the electric grid and the net load profile of the CL. Where the net load of the electric grid is relatively high, the net load of the CL is relatively low, and where the net load of the electric grid is relatively low, the net load of the CL is relatively high. Similarly, where the net load of the electric grid is increasing, the net load of the CL is decreasing, and where the net load of the electric grid is decreasing, the net load of the CL is increasing.

Figure 9B:
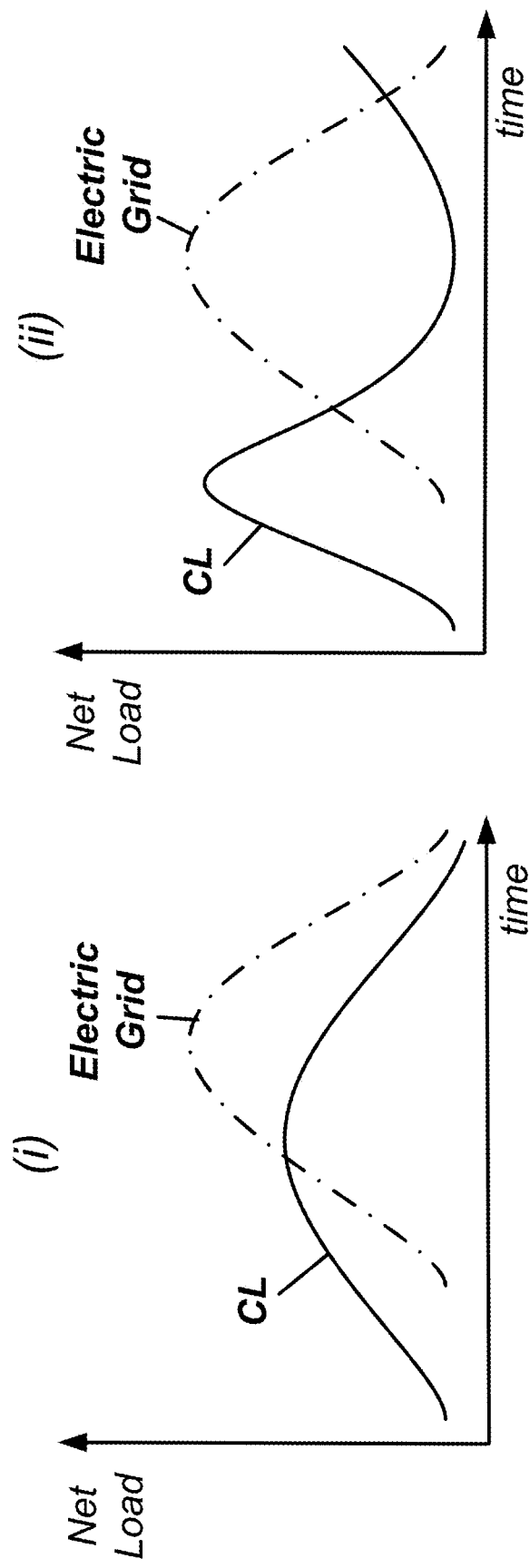
FIG. 9B is a second example set of plots comparing net load profiles for a controllable load and an electric grid, in accordance with some embodiments.

FIG. 9B is a second example set of plots comparing net load profiles (net load versus time) for a CL and for an electric grid, e.g., for a common time period, in accordance with some embodiments. The plots of FIG. 9B are not drawn "to scale" (e.g., the magnitude of the CL's net load, in practice, would typically be far lower than the magnitude of the electric grid's net load), but instead are scaled for readability. The plots of FIG. 9B can represent, for example, net load profiles for a CL that includes a data center (e.g., an AI training facility and/or cryptocurrency miner). As can be observed in the lefthand plot (i) of FIG. 9B, a peak net load value of the electric grid (e.g., when demand for electricity from the grid is high and thus the associated cost of receiving power from the electric grid has reached a local or global maximum, for example at 5 pm PT) is substantially aligned, timewise, with a relatively high level of operation of the data center, and an area under the curve (AUC) of the CL net load profile that overlaps with an AUC of the electric grid's net load profile has a first value. The righthand plot (ii) of FIG. 9B shows a remediated/improved net load profile for the CL and the electric grid, e.g., as implemented by a system such as system 100 of FIG. 1 and/or using one or more methods described herein, where the peak net load value of the electric grid's net load profile is now substantially aligned, timewise, with a trough/low value of the CL net load profile, and the AUC of the CL net load profile that overlaps with the AUC of the electric grid's net load profile has a second value that is less than the first value. Moreover, the righthand plot (ii) of FIG. 9B can represent a pre-charging of one or more batteries of the CL and/or a pre-cooling of the CL during a period of time when it is more favorable to do so (e.g., from the standpoint of price and/or demand for energy from the electric grid), followed by a ramp down and/or idling of the operation of the CL during the subsequent period of time when it would be less favorable to operate or to power the CL using the electric grid.

Figure 9C:
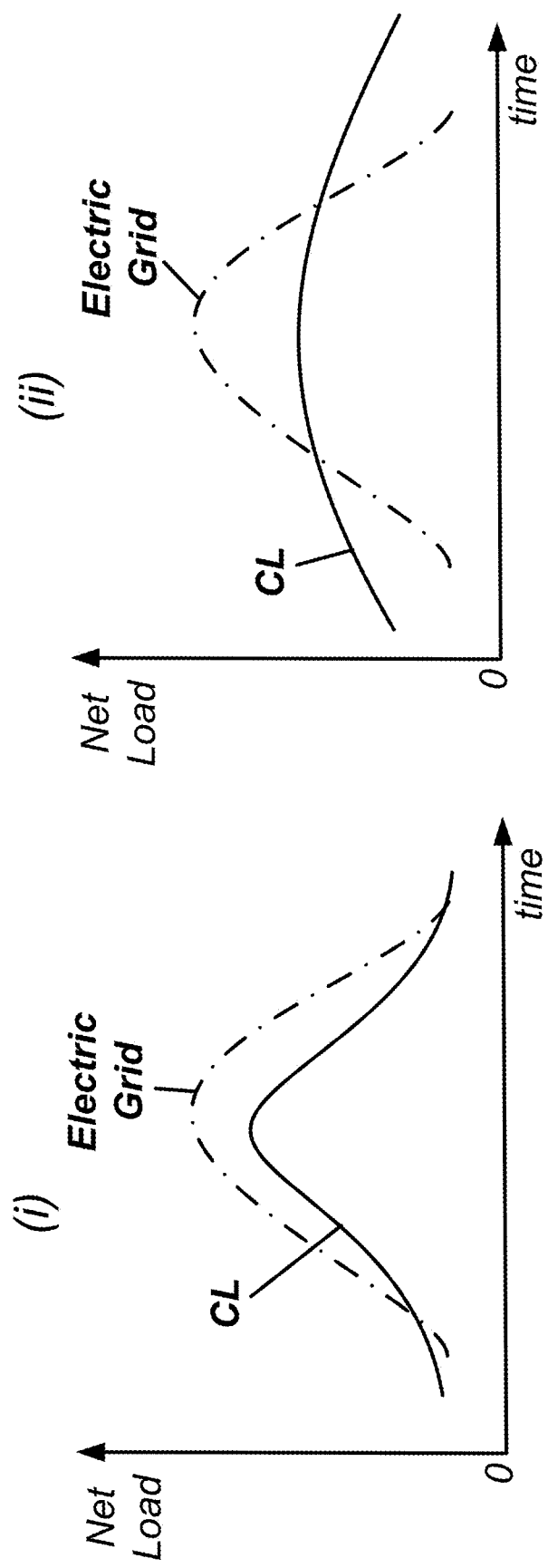
FIG. 9C is a third example set of plots comparing net load profiles for a controllable load and an electric grid, in accordance with some embodiments . . .

FIG. 9C is a third example set of plots comparing net load profiles for a controllable load and an electric grid, in accordance with some embodiments. The plots of FIG. 9C are not drawn "to scale" (e.g., the magnitude of the CL's net load, in practice, would typically be far lower than the magnitude of the electric grid's net load), but instead are scaled for readability. As can be observed in the lefthand plot (i) of FIG. 9C, a peak net load value of the electric grid (e.g., when demand for electricity from the grid is high and thus the associated cost of receiving power from the electric grid has reached a local or global maximum, for example at 5 pm PT) is substantially aligned, timewise, with a relatively high level of operation of the CL. The righthand plot (ii) of FIG. 9C shows a remediated/improved net load profile for the CL and the electric grid, e.g., as implemented by a system such as system 100 of FIG. 1 and/or using one or more methods described herein, where the peak net load value of the electric grid's net load profile is still substantially aligned with a locally high level of operation of the CL, however the upper range of the magnitude of the net load of the CL has been significantly reduced to reduce the impact of consuming power from the electric grid during peak net load/peak pricing periods.

In some implementations, the electric grid can have a very low net load over a given period/interval of time. In some electric grid markets, this can lead to very low or negative energy prices as the grid is approaching a dangerous regime of overgeneration leading to over voltage conditions, and is potentially risking failure of the electric grid. Under such circumstances, the controllable load's net load profile may be controlled to be negatively (e.g., inversely) correlated with the net load profile of the electric grid, such that the CL is directed/instructed to increase its load as much as possible to help stabilize the electric grid (and, optionally, to take advantage of the low or negative prices).

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations, e.g., including cloud-based computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used herein, in particular embodiments, the terms "substantially," "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure. The term "substantially," when referencing a non-numeric value, generally means "to a great or significant extent." For example, "substantially curved" can refer to a shape that approximates a curve but may not be perfectly symmetrical or curvilinear.

The indefinite articles "a" and "an," as used herein in the specification and in the embodiments, unless clearly indicated to the contrary, should be understood to mean "at least one."

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The invention claimed is:

1. A system, comprising:
   at least one renewable energy source (RES) configured to electrically couple to a grid interconnection point of an electric grid, an aggregated alternating current (AC) power output capacity of the at least one RES exceeding a point of grid interconnect (POGI) limit of the grid interconnection point;
   at least one energy storage system (ESS) that is electrically coupled to the grid interconnection point and the at least one RES and that has an aggregated power capacity that is less than the aggregated AC power output capacity of the at least one RES; and
   a controller that is communicatively coupled with at least one controllable load (CL), the at least one ESS, and the at least one RES, the controller configured to control a net load profile of the at least one CL such that the net load profile of the at least one CL includes at least one value between a maximum net load value and a minimum net load value of the at least one CL, the controller further configured to:
   provide a first instruction to at least one of the at least one RES or the at least one ESS to provide a first portion of electric power generated by the at least one RES or stored by the at least one ESS to the at least one CL up to an aggregated power demand;
   provide a second instruction to at least one of the at least one RES or the at least one ESS to provide a second portion of electric power to the electric grid in response to (A) electric power generated by the at least one RES exceeding an aggregated power capacity and the aggregated power demand, or (B) the controller, using a predictive algorithm and power data, determining that a grid condition exists in a power system forecast; and
   in response to determining that the grid condition exists without the electric power generated by the at least one RES exceeding the aggregated power capacity and the aggregated power demand, providing a third instruction to the at least one CL to one of increase or decrease a power demand at the at least one CL.

2. The system of claim 1, wherein the aggregated AC power output capacity of the at least one RES exceeds the POGI limit by a factor of between about 3 and about 6.

3. The system of claim 1, wherein the grid condition is associated with at least one of a price of power associated with the electric grid, a price of ancillary services associated with the electric grid, a curtailment associated with the electric grid, a congestion price associated with the electric grid, or a decongestion value associated with the electric grid.

4. The system of claim 1, wherein the system has an associated capacity factor of at least about 60%.

5. The system of claim 1, wherein a ratio of the power generated by the at least one RES to an aggregate load of the at least one CL is between about 3 and about 6.

6. The system of claim 1, wherein the controller is further configured to operate the at least one RES or the at least one ESS as at least one of a peaker plant for the electric grid or a provider of ancillary services to the electric grid, and the grid condition is associated with at least one of a price of power associated with the electric grid, a price of ancillary services associated with the electric grid, a curtailment associated with the electric grid, a congestion price associated with the electric grid, or a decongestion value associated with the electric grid.

7. The system of claim 1, wherein the at least one CL includes a plurality of CLs, and the controller is further configured to provide instructions to the plurality of CLs to balance an energy distribution associated with the plurality of CLs.

8. The system of claim 1, wherein the at least one CL includes a data center.

9. The system of claim 1, wherein the at least one CL includes an artificial intelligence (AI) training center.

10. The system of claim 1, wherein the at least one CL includes a cryptocurrency miner.

11. The system of claim 1, wherein the at least one CL includes an electric vehicle (EV) charging station.

12. The system of claim 1, wherein the at least one CL includes a vertical farm.

13. The system of claim 1, wherein the at least one CL includes a hydrogen production facility.

14. The system of claim 1, wherein the at least one CL includes a water treatment plant (including desalination and purification).

15. The system of claim 1, wherein the at least one CL load includes an industrial process heater.

16. The system of claim 1, wherein the at least one CL load includes a thermal battery.

17. The system of claim 1, wherein the controller is further configured to cause delivery of power from the electric grid to the at least one CL load.

18. The system of claim 1, wherein the controller is further configured to select the first instruction such that a correlation of the at least one CL with the electric grid is changed in response to the first instruction.

19. The system of claim 1, wherein the controller is further configured to select the first instruction such that a correlation of (1) at least one peak of a net load profile associated with the at least one CL, with (2) at least one peak of a net load profile associated with the electric grid is changed in response to the first instruction.

20. The system of claim 1, wherein the first instruction is configured to cause a change in a correlation of the at least one CL with the electric grid in response to the at least one first instruction.

21. The system of claim 1, wherein the system is configured to: (1) operate in a first mode as at least one of a baseload, a semi-baseload, a semi-peaker plant, or a peaker plant for the at least one CL, and (2) concurrently with operating in the first mode, operate in a second mode as at least one of a peaker plant, a semi-peaker plant, a semi-baseload, a baseload, or a provider of ancillary services for the electric grid.

22. The system of claim 1, wherein the controller is further configured to provide a fourth instruction to at least one non-renewable energy source (NRES) to cause the at least one NRES to provide a third portion of electric power generated by the at least one NRES to the at least one CL.

23. A method of providing power on an RES-ESS-CL system, the method comprising:
providing, at a first time and by at least one of an RES or an ESS, power to a point of grid interconnect (POGI) associated with an electric grid, the POGI disposed between at least one CL and the electric grid;
providing, at a second time and by the at least one of the RES or the ESS, power to the at least one CL;
providing, at a third time, power received from the electric grid at the POGI to the ESS;
providing, at a fourth time, power from received from the electric grid at the POGI to the at least one CL; and
providing, at a fifth time, no power via the POGI and providing at least one of power from the ESS to the at least one CL, power from the RES to the at least one CL, or power from the RES to the ESS.

24. The method of claim 23, further comprising:
providing, at the fourth time, power from at least one of the RES or the ESS to the at least one CL.

25. The method of claim 23, further comprising:
providing, at the fourth time, power from the RES to at least one of the ESS or the at least one CL.

26. The method of claim 23, wherein the providing at the fifth time includes providing (1) power from the ESS to the at least one CL, and (2) one of: power from the RES to the at least one CL or power from the RES to the ESS.

27. The method of claim 23, wherein the providing at the fifth time includes providing (1) power from the RES to the at least one CL, and (2) one of: power from the ESS to the at least one CL or power from the RES to the ESS.

28. The method of claim 23, wherein the providing at the fifth time includes providing (1) power from the RES to the ESS, (2) power from the RES to the at least one CL, and (3) power from the ESS to the at least one CL.

29. The method of claim 23, further comprising:
providing, at a sixth time, power from at least one non-renewable energy source (NRES) to the at least one CL.

30. A system, comprising:
at least one renewable energy source (RES) configured to electrically couple to a grid interconnection point of an electric grid;
at least one energy storage system (ESS) that is electrically coupled to the grid interconnection point and the at least one RES;
at least one non-renewable energy source (NRES); and
a controller that is communicatively coupled with at least one CL, the at least one ESS, the at least one NRES, and the at least one RES, the controller configured to:
provide a first instruction to at least one of the at least one RES, the at least one NRES, or the at least one ESS to provide a first portion of electric power to the at least one CL up to an aggregated power demand;
provide a second instruction to at least one of the at least one RES, the at least one NRES, or the at least one ESS to provide a second portion of electric power to the electric grid; and
in response to determining that a grid condition exists, provide a third instruction to the at least one CL to one of increase or decrease a power demand at the at least one CL.

* * * * *